(12) United States Patent
Seko et al.

(10) Patent No.: US 7,009,713 B2
(45) Date of Patent: *Mar. 7, 2006

(54) OPTICAL POSITION MEASURING SYSTEM USING AN INTERFERENCE PATTERN

(75) Inventors: Yasuji Seko, Kanagawa (JP); Hiroyuki Hotta, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 302 days.

This patent is subject to a terminal disclaimer.

(21) Appl. No.: 10/426,632

(22) Filed: May 1, 2003

(65) Prior Publication Data

US 2004/0004723 A1    Jan. 8, 2004

(30) Foreign Application Priority Data

May 2, 2002 (JP) .......................... P2002-130341
Nov. 20, 2002 (JP) .......................... P2002-336341

(51) Int. Cl.
*G01B 9/02* (2006.01)

(52) U.S. Cl. ..................................... 356/498

(58) Field of Classification Search ............... 356/498, 356/496, 450, 519, 614, 520; 250/221, 559.29
See application file for complete search history.

(56) References Cited

U.S. PATENT DOCUMENTS

| | | | | |
|---|---|---|---|---|
| 4,627,722 A | * | 12/1986 | Falk et al. | 356/141.5 |
| 5,699,158 A | * | 12/1997 | Negishi | 356/520 |
| 6,100,538 A | * | 8/2000 | Ogawa | 250/559.29 |
| 6,714,311 B1 | * | 3/2004 | Hashimoto | 356/623 |

FOREIGN PATENT DOCUMENTS

JP    B2 4-8724    2/1992

* cited by examiner

*Primary Examiner*—Gregory J. Toatley, Jr.
*Assistant Examiner*—Sarah J. Chisdes
(74) *Attorney, Agent, or Firm*—Oliff & Berridge, PLC

(57) ABSTRACT

A position measuring system including a laser light source for radiating a laser beam, an optical lens system for generating an interference pattern on the basis of the laser beam having passed through different optical paths, a detector for detecting the interference pattern, and an arithmetic unit for calculating the position of at least one of the light source and the detector on the basis of a detection signal issued from the detector. For example, a spherical lens can be used as the optical lens system. In this case, the interference pattern is formed on the basis of spherical aberration of the lens. Alternatively, a multifocal lens may be used as the optical lens system.

53 Claims, 21 Drawing Sheets

MEASURED VALUE 0.47mm 0.62mm
FROM CENTER 26.25mm

OPTICAL POSITION MEASURING SYSTEM USING AN INTERFERENCE PATTERN

The present disclosure relates to the subject matter contained in Japanese Patent Application No. 2002-130341 filed May 2, 2002 and Japanese Patent Application No. 2002-336341 filed Nov. 20, 2002, which are incorporated herein by reference in their entirety.

BACKGROUND OF THE INVENTION

1. Field of the Invention

The present invention relates to a position measuring system for measuring the one-dimensional, two-dimensional or three-dimensional position of an object accurately by using a phenomenon of interference of light. The invention can be applied to an input device such as a mouse, a pointer, a pen input device or a distance image input device as well as the position measuring system.

2. Description of the Related Art

Heretofore, an optical interference measurement method using interference of light has been widely used as a method for measuring a position accurately. As the optical interference measurement method, for example, there is a method in which: light emitted from a laser light source is divided into two by a beam splitter or the like; an object is irradiated with a part of the light whereas a mirror is irradiated with the other part of the light as a reference beam so that the two parts of the light are returned to the original optical path; and the reflected beam from the object and the reference beam are superposed on each other to thereby generate interference of light. This method has an advantage in that a position or displacement can be measured with resolving power of not larger than a wavelength. In this method, it is however necessary to provide optical components such as a beam splitter and a reflecting mirror. There is a problem that a large number of components are required to cause increase in cost. Furthermore, high positional accuracy is required for assembling these components. There is a problem that a great deal of labor is required to cause increase in cost. In addition, when the object is moving, an automatic tracking mechanism or the like is required for tracking the moving object. There is a disadvantage in greater increase in cost.

A laser interference measuring machine in which the number of components can be reduced has been disclosed in JP-B-4-8724.

This measuring machine uses a gradient index lens. The gradient index lens is formed by dispersion of ions into an optical glass rod so that the value of the refractive index in a position of the optical glass rod becomes lower as the position becomes farther from the center axis of the optical glass rod. For example, a semi-transparent mirror on which gold is deposited is formed at an output end on a side opposite to an input end of the gradient index lens. Interference occurs between a direct beam emitted from a laser unit and a reflected beam reflected by the semi-transparent mirror of the gradient index lens and further reflected by the output end surface of the laser unit so as to be input to the gradient index lens again. In this measuring machine, the number of components can be reduced to a certain degree compared with the aforementioned interference measurement method. It is however necessary to provide the gradient index lens and to form the semi-transparent mirror. It cannot be the that this measuring machine is satisfactory from the point of view of cost.

As another example of the optical interference measurement method, there is a method using a diffraction grating or slit. To generate interference of light by use of the diffraction grating or slit, fine processing is required because the diffraction grating or slits with a pitch equal to about a wavelength must be formed. There is a problem that these components are expensive. Further, when the diffraction grating is used, the distance from the diffraction grating to an object must be selected to be very short. If the distance is long, the diffraction phenomenon cannot be observed so that there is a problem that the diffraction grating cannot be used for position measurement. When the slit is used, the slit width is equal to about a wavelength. Accordingly, even in the case where the slit is irradiated with a laser beam, the quantity of light having passed through the slit is reduced greatly. There is a problem that it is difficult to use the slit in an ordinary environment.

On the other hand, in a position measuring method not using interference of light, it is generally difficult to perform high-sensitive high-accurate measurement. When, for example, an image of an object is picked up by a CCD and the position of the object is analyzed on a display screen, resolving power basically depends on the number of pixels in the CCD. Accordingly, the size obtained by dividing a region of a real space projected onto the CCD by the number of pixels forms basic resolving power. Roughly speaking, when an image of an object about 1.3 m×1 m is picked up by a digital camera having a CCD with 1300×1000 (1300000) pixels, basic resolving power is about 1 mm. There are however a lot of applied examples in which the resolving power of about 1 mm is not useful. For example, resolving power of 0.1 mm or smaller is required for accurately recognizing a character written with a ball point pen. Or higher resolving power is required when a device chip or the like is automatically mounted on a substrate in the case of semiconductor mounting. As other cases, there are a lot of cases where the position of an object needs to be measured accurately with resolving power of the order of submillmeter or smaller. It is however difficult to achieve submillimeter accuracy in the simple measuring method using a CCD camera or the like. If a special CCD or the like with a very large number of pixels is used or a zoom-up function is provided, the position can be measured with high accuracy. There is however a disadvantage in that the cost increases.

In three-dimensional position measurement, a measuring method using interference of light is used for measuring the position of an object with high accuracy. As described above, in the related art, there is however a problem in increase in the cost of components for forming an interference optical system, increase in positional accuracy required for assembly, increase in the number of assembling steps caused by increase in the number of components, inaptitude for measuring the position of a moving body, and so on.

SUMMARY OF THE INVENTION

Therefore, an object of the invention is to provide a position measuring system in which position measurement using interference of light can be performed by a simple configuration and at low cost.

The foregoing object is achieved by a position measuring system including a light source radiating laser beam, an optical lens system generating an interference pattern of rays of the laser beam each having passed through different optical path, a detector of the interference pattern, and an arithmetic unit for calculating the position of an object on the basis of a detection signal issued from the detector.

In the position measuring system according to the invention, the arithmetic unit may calculate a position of at least one of the light source and the detector as the position of the object. The position measuring system may include an irradiation unit for irradiating the object with the laser beam, wherein the optical lens system generates the interference pattern of the rays of the laser beam each having passed through different optical path after the laser beam has been reflected by the object. In the position measuring system, the optical lens system may generate the interference pattern on the object, and the detector may detect the interference pattern on the object.

The interference pattern can be obtained by use of spherical aberration of a lens. The optical lens system may use the following lenses. That is, the optical lens system may use: a so-called multifocal lens having two or more focal points; a combination of a small outer diameter lens and a large outer diameter lens arranged on an optical axis; a conical lens, a triangular prism, and a polyangular pyramid lens; a one-piece lens formed by combination of a plurality of lenses; a one-piece lens formed by combination of a plurality of lenses having focal points located on one optical axis; and a one-piece lens formed by combination of a plurality of lenses having focal points located on different optical axes. The curvature radius on the light output side of the lens can be constituted by one kind of curvature. The optical lens system may include a reflecting mirror. The arithmetic unit can calculate the position on the basis of the quantity of movement of the interference pattern, can calculate the position on the basis of the number of interference fringes in the interference pattern or can calculate the position on the basis of the shape of the whole of the interference pattern.

The detector may include a plurality of detectors so that the arithmetic unit can calculate the three-dimensional position of the light source by using the plurality of detectors. The light source may include a plurality of light sources so that the arithmetic unit can calculate the three-dimensional position of the detector by using the plurality of light sources. The object may include a reflecting member having a high reflectance region.

In the position measuring system according to the invention, the light source may include a plurality of light sources radiating laser beams at different wavelengths respectively, the optical lens system may include a plurality of optical lens systems generating interference patterns from the laser beams respectively, the detector may include a plurality of detectors detecting the interference patterns respectively. The arithmetic unit can calculate the position of at least one of the plurality of detectors on the basis of detection signals issued from the plurality of detectors respectively.

The plurality of light sources may radiate laser beams successively as pulse lights so that the plurality of detectors can detect the interference patterns in synchronism with the laser beams respectively. Each of the plurality of optical lens systems may include a conical lens. The light source and the optical lens system may be disposed in a casing. The detector and the arithmetic unit may be disposed in a casing.

The position measuring system according to the invention may include a pointer including the light source and the optical lens system for projecting an interference pattern on a display. The detector may be disposed near the display so as to detect the interference pattern to thereby calculate the center position of the interference pattern. The pointer can move a cursor indicated on the display on the basis of the center position of the interference pattern. The light source of the pointer can change its pulse light-emitting time. The detector can detect the change of the pulse light-emitting time of the light source.

An input device used for a position measuring system according to the invention includes the light source, and a pen used for writing on papers, the pen is integrated with the light source. In this case, the light source can radiate the laser beam on the basis of pressure produced when a character is written with the pen.

The optical lens system may include a hemisphere lens or a sphere lens. The optical lens system may be provided so that a first surface of a lens to which light is input is formed as a convex spherical surface and a second surface of the lens from which light is output is formed as a planar surface and disposed closely to the detector. The optical lens system may be provided so that a first surface of a lens to which light is input is formed as a convex spherical surface; and a gap between the spherical surface and the detector is filled with a substance having a predetermined refractive index. A stop may be further provided on a light input side of the optical lens system.

The detector may include an array of photo acceptance elements arranged one-dimensionally or two-dimensionally. The array may be replaced by two arrays each of which has photo acceptance elements arranged one-dimensionally and which are disposed so as to be perpendicular to each other in a plane perpendicular to an optical axis.

In the input device, the pen may include a pressure sensor for detecting pressure produced when a character is written and light quantity of the light source which varies according to the pressure is input as pen pressure information. The arithmetic unit can calculate a plane on which the character is written, on the basis of information of the three-dimensional position of the pen to thereby acquire the shape of the character written on the plane. The pen may include a reflecting mirror by which the laser beam radiated from the light source is reflected at a wide angle.

In a distance image acquiring system according to the invention, the detector is a camera unit for picking up an image of the interference pattern generated on the object, the interference pattern is a periodic interference pattern having light intensity varying periodically and the arithmetic unit acquires distance image of the object on the basis of phase information in the periodic variation of light intensity.

In this system, the light source and the optical lens system disposed just in front of the light source maybe integrated as a light source module, and a plurality of light source modules as defined above may be disposed so that a plurality of periodic interference patterns are formed on the object and that the distance image of the object is acquired on the basis of phase information in the plurality of periodic interference patterns. The plurality of light source modules can emit laser beams at different wavelengths respectively, the camera unit may include a plurality of photo acceptance sensors for detecting light according to the laser beams, and the distance image can be acquired on the basis of image information of the interference patterns corresponding to the different wavelengths. The light source for radiating the laser beam may be composed of three light source modules for outputting red, green and blue laser beams, the camera unit may include three photo acceptance sensors for detecting the red, green and blue laser beams, and the distance image of the object can be acquired on the basis of image information in the interference patterns of the red, green and blue laser beams. A reference beam projecting unit may be further disposed near the installation place of the light source modules for projecting a reference beam onto the object so that the arithmetic unit can calculate phase information of each pixel in an image of the object picked up by the camera unit on the basis of comparison between luminance information of the reference beam detected by the detector and luminance information of the interference patterns detected by the detector.

Also, the position measuring system according to the invention may be constructed so that the arithmetic unit calculates a point of intersection between an optical axis of the optical lens system and a detection surface of the detector.

In this system, the arithmetic unit can measure a linear equation expressing the optical axis of the optical lens system or the three-dimensional position of the light source. The arithmetic unit can calculate a linear equation expressing the optical axis on the basis of change of curvature in elliptic shape of the interference pattern and calculate the distance to the light source on the basis of the pitch of arrangement in the interference pattern to thereby measure the three-dimensional position of the light source. The detector may be replaced by a plurality of detectors disposed closely to one another so that a region of the interference pattern detected by the detector can be enlarged to improve accuracy in detection of the three-dimensional position of the light source. The detector may be composed of a camera having a camera lens so that the camera can pick up an image of the interference pattern having a region larger than the size of a photo acceptance element built in the camera. In addition to the detector for detecting the interference pattern, an image pick-up unit for picking up an image of the light source may be provided so that the three-dimensional position of the light source can be measured on the basis of the interference pattern detected by the detector and the image of the light source picked up by the image pick-up unit.

A pointer system according to the invention includes a pointer module in which the light and the optical lens system are integrated with each other, and a cursor position display means, wherein the object is a display region of an image, the detector is disposed near the object, and the cursor position display means displays a cursor at a position of a point of intersection between an optical axis of the optical lens system and a detection surface of the detector or at the position of the light source projected onto the display region.

In this system, the detector or the image pick-up unit may be replaced by a plurality of detectors or image pick-up units disposed at two or more places for characterizing the display region to thereby specify the display region. The display region may be rectangular or shaped like a rectangle, and the detectors or image pick-up units may be disposed at opposite ends of a side of the display region or at two corners of a diagonal line of the display region or at midpoints of long and short sides of the display region to thereby specify the display region. Configuration may be made so that the position of a point of intersection between the optical axis of the optical lens system and the detection surface of the detector is used as a cursor position when the light source is far from the display region whereas the position of the light source projected onto the display region is used as a cursor position when the light source is near to the display region. The pointer module may be provided with a button equivalent to a left or right click button of a computer mouse so that when the button is operated, the light source can be turned on and off at intervals of a predetermined time or in a predetermined time sequence pattern so that the resulting optical signal is received by the detector or image pick-up unit to thereby perform the function of the left or right click button.

By the aforementioned configuration, interference of light can be generated in spite of simple means, a small number of components and a simple number of assembling steps, so that high-sensitive position measurement or the like can be obtained at low cost.

DETAILED DESCRIPTION OF THE PREFERRED EMBODIMENTS

Embodiments of a position measuring system according to the invention will be described below. Prior to that, however, the principle of the invention will be described first.

Figure 1A:
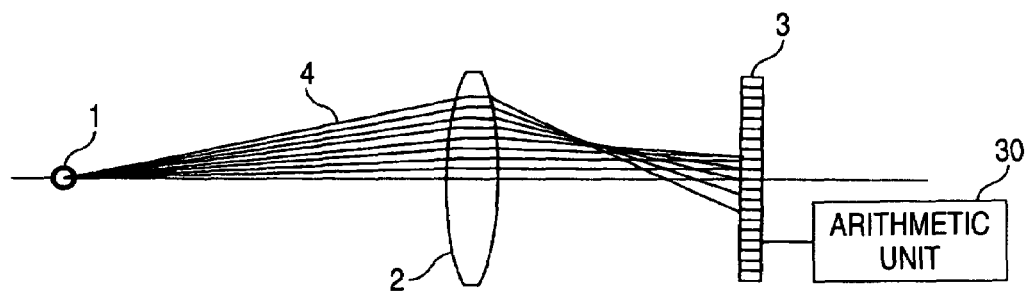
FIGS. 1A and 1B are views showing an embodiment of a position measuring system according to the invention.
Figure 1B:
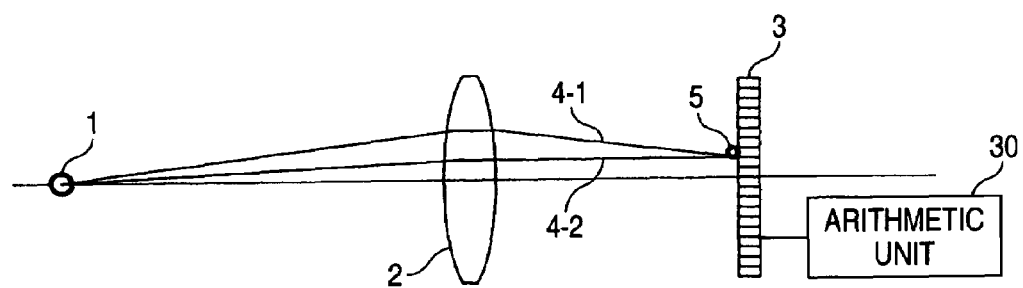

Referring first to FIGS. 1A and 1B, the principle of interference of light generated in a simple optical system will be described. In FIGS. 1A and 1B, light radiated from a laser light source 1 forms an interference pattern on a CCD photo acceptance element 3 by an optical lens system 2. Assume now a simple example in which the optical lens system 2 is a concave spherical lens and a light-emitting point is on a center axis (optical axis) of the lens. When an image of light input from the light-emitting point to the lens is formed, a part of light having passed through a portion near to the center of the lens and a part of light having passed through a portion far from the center of the lens pass through different points respectively on the optical axis because of spherical aberration of the optical lens. Loci 4 of parts of light are shown in FIG. 1A. Although loci of parts of light having passed through an upper half of the lens are shown in FIG. 1A, parts of light having passed through a lower half of the lens behave in the same manner as the parts of light having passed through the upper half of the lens. Assume now two parts of light reaching a certain point 5 on the CCD as shown in FIG. 1B because interference of light is generated on the basis of the phase difference between the parts of light. Two parts of light having passed through optical paths 4-1 and 4-2 respectively reach the point 5 on the CCD. In this case, interference occurs because the optical paths 4-1 and 4-2 are different in optical path length. Assume now that L1 and L2 are the optical path lengths of the optical paths 4-1 and 4-2 respectively and are different by ΔL. Electric field intensity E of light at the interference point 5 can be expressed as a function of optical path lengths L1 and L2 and wavelength λ and can be represented by the formula:

$$E = \exp(2\pi L1/\lambda * i) + \exp(2\pi L2/\lambda * i) \quad (1)$$
$$= 2\cos(\pi * L/\lambda) * \exp(i\pi(L1+L2)/\lambda)$$

in which i is an imaginary unit, λ is the wavelength of the laser beam.

The optical path lengths have values in consideration of the refractive indices of air and the lens. Intensity I of light can be expressed as the square of the electric field intensity and can be represented by the formula:

$$I = |E|^2 \quad (2)$$

The intensity of the laser beam at the interference point 5 on the CCD can be expressed by using these formulas and the angle of incidence of light onto the CCD. As a result of calculation of the intensity of light on the whole surface of pixels in the CCD, it has been found that such an interference fringe pattern can be formed by a simple lens system on the basis of spherical aberration of the optical lens. Generally, when a simple spherical lens is used, the distance between adjacent interference fringes is often too narrow to observe the interference fringe pattern. The distance between adjacent interference fringes can be widened if the distance from the light source to the spherical lens is made short while the distance from the spherical lens to the CCD is made long.

Figure 2:
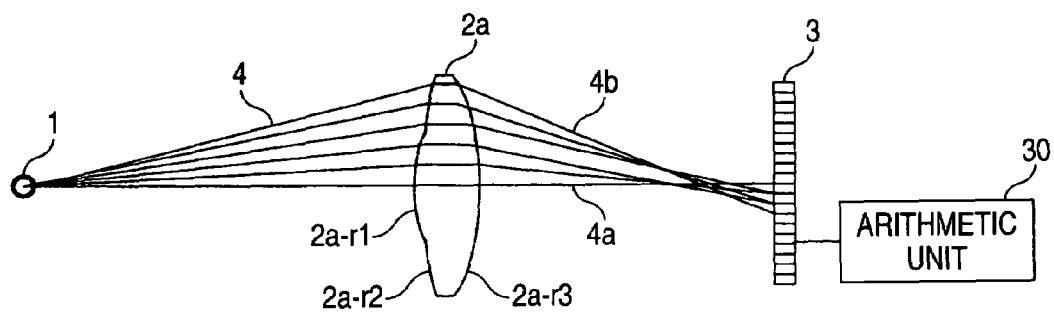
FIG. 2 is a view showing another embodiment of the position measuring system according to the invention.

If a bifocal lens as shown in FIG. 2 is used, the distance from the spherical lens to the CCD can be also shortened. In the case of a bifocal lens, spherical aberration has no relation to formation of interference fringes. The curvature radius of this lens and the position of the center of the spherical surface of this lens are changed so that the focal length of an inner region of the lens near to the optical axis is different from the focal length of an outer region of the lens surrounding the outside of the inner region of the lens. When this lens is used, parts of light having passed through optical paths 4a and 4b respectively overlap each other on the CCD 3 in a state of an inverted image to thereby form interference fringes. The bifocal lens has a merit that the distance between adjacent interference fringes can be widened because phases of parts of light interfering with each other change slowly on the CCD. Accordingly, when this lens is used, a pattern of interference fringes permitting a general CCD to recognize an image sufficiently can be formed even in the case where the distance between the lens and the CCD is short. Although FIG. 2 shows the case where the bifocal lens is used, the invention may be also applied to the case where another multifocal lens is used.

As is obvious from the formula (1), the intensity of the pattern of interference fringes varies widely according to ΔL/λ. Generally, because λ is equal to or smaller than about 1 μm, the optical path difference ΔL varies according to the slight positional change of the light source. As a result, ΔL/λ varies widely. That is, because the pattern of interference fringes varies widely according to the slight positional change of the light source, high-accurate position measurement can be performed.

(Embodiment 1)

FIGS. 1A and 1B are views showing an embodiment of the position measuring system according to the invention. This embodiment is provided for forming an interference pattern by use of spherical aberration of a spherical lens to thereby perform position measurement. The position measuring system includes a laser light source 1 for radiating a laser beam, a spherical lens 2 for forming an interference pattern on an object on the basis of the laser beam having passed through different optical paths, a CCD 3 for detecting the interference pattern, and an arithmetic unit 30 for calculating the position of the light source or the object (CCD) on the basis of a signal issued from the CCD.

In this embodiment, the interference pattern formed on the basis of spherical aberration of the lens varies according to the distance to the object on which the interference pattern is formed. That is, the interference pattern is not formed as a pattern of a constant shape. This situation will be described with reference to FIG. 1A. Assume now that the distance to the object (the CCD 3 in this case) on which the interference pattern is formed is changed in the condition that the light source 1 and the lens 2 are fixed. A part of light having passed through the outermost circumference of the lens 2 is refracted most largely because of spherical aberration. When the object is very near to the lens 2, the object is irradiated with a part of light having passed through a portion near to the outermost circumference of the lens 2 and a part of light having passed through a portion near to the optical axis of the lens 2 with little overlap of the two parts of light. As the object is made far from the lens, a part of light having passed through the outermost circumference of the lens comes near to the optical axis and overlaps a part of light having passed through the inside of the outermost circumference so that interference is generated on the object. When the object is made farther from the lens, a part of light having passed through a portion near to the outermost circumference of the lens crosses the optical axis and reaches the opposite side of the lens. That is, a part of light having passed through a portion near to the outermost circumference in the upper half of the lens in FIG. 1A crosses the optical axis and overlaps a part of light having passed through a portion near to the optical axis in the lower half of the lens in FIG. 1A so that an interference pattern is formed on the object. When the object is made farther from the lens, a part of light having passed through a portion near to the optical axis crosses the optical axis so that the object is irradiated with almost all parts of light having passed through the lens 2, on the opposite side of the lens. As a result, overlap of parts of light is almost eliminated, so that interference cannot be observed. As described above, the distance to the object and the interference pattern can be decided in one-to-one correspondence. Accordingly, when the distance to the object is changed, an interference pattern of a constant shape is not formed on the object. That is, the distance to the object can be decided on the basis of observation of the interference pattern. The position of the object (CCD) is calculated by the arithmetic unit 30 on the basis of a signal issued from the CCD detecting the interference pattern. A unit heretofore used can be used as the arithmetic unit 30. An experimental example will be described below.

A CCD was used as an object of distance measurement. At the same time, the CCD was used as a detector for detecting the interference pattern. A semiconductor laser at a wavelength of 650 nm was used as the laser light source. A spherical lens having a diameter of Φ50 mm, a curvature radius of 160 nm in each of front and rear surfaces, a maximum thickness of 10 mm and a refractive index of 1.77 was used. The distance from an output port of the semiconductor laser to the front surface of the spherical lens was set at 98 mm. The CCD was disposed on the optical axis and at a distance of several meters.

Figure 3:
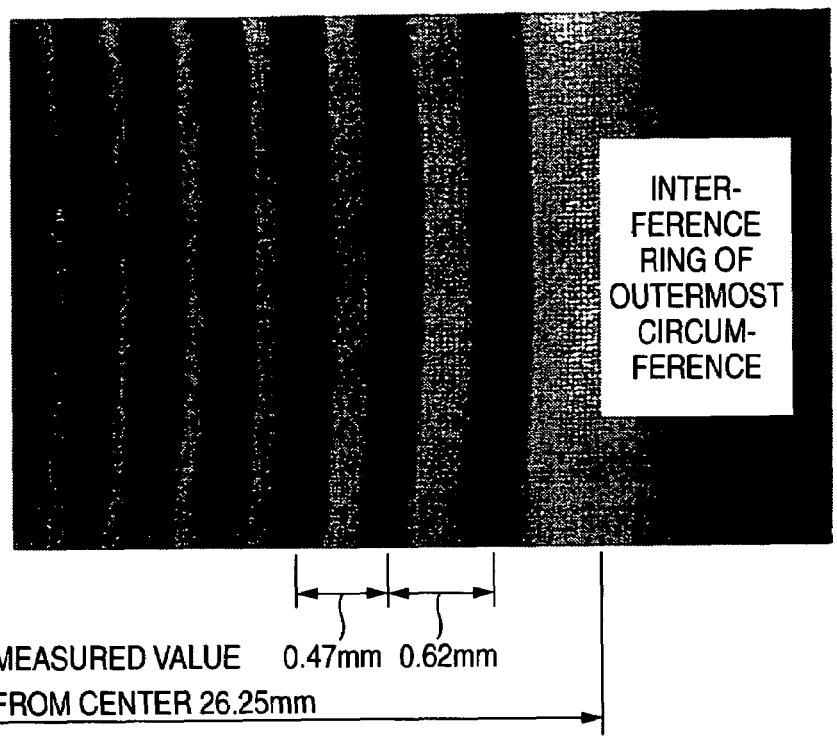
FIG. 3 is a view showing an example of an interference fringe pattern grasped by a CCD.
Figure 4:
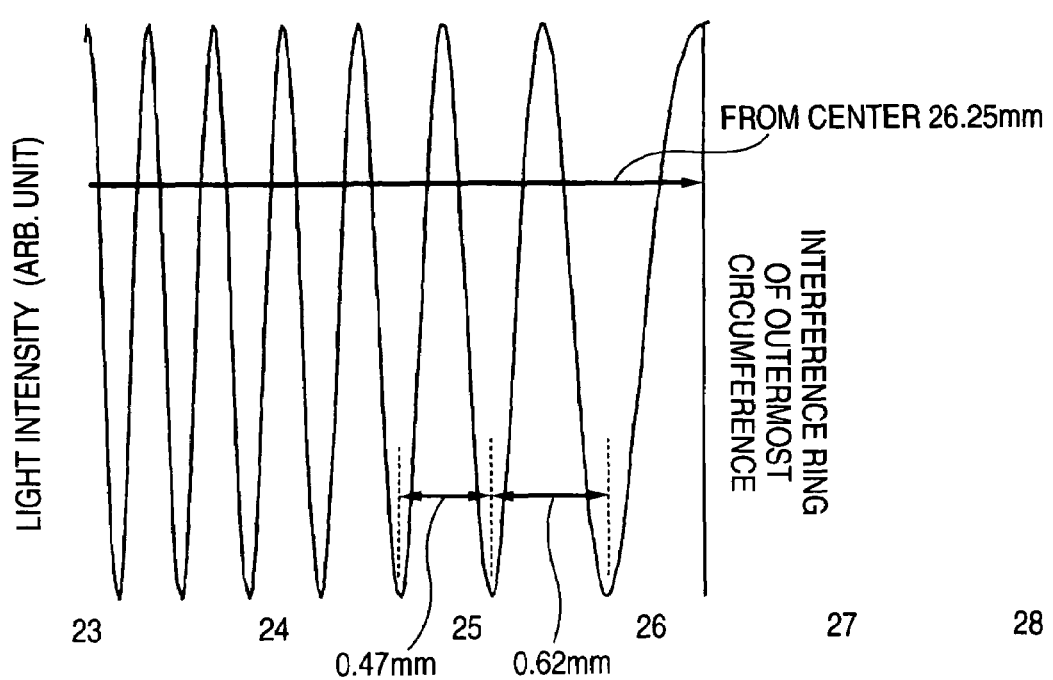
FIG. 4 is a view showing an interference fringe pattern obtained by optical simulation.

FIG. 3 is a view showing an example of the interference fringe pattern grasped by the CCD. As shown in FIG. 3, interference fringes neatly arranged on concentric circles were formed. The interference pattern was formed on the basis of spherical aberration of the spherical lens. It was confirmed that a pattern of interference fringes shaped like concentric circles could be actually formed by the embodiment shown in FIGS. 1A and 1B. FIG. 4 shows an interference fringe pattern obtained by optical simulation in the case where the distance from the rear surface of the spherical lens to the CCD is 4060 mm. In the two interference fringe patterns, as shown in FIGS. 3 and 4, the distance from the center to an interference ring of the outermost circumference was 26.25 mm, and the distances between adjacent interference rings near the outermost circumference were 0.62 mm and 0.47 mm. Because the interference patterns shown in FIGS. 3 and 4 respectively were completely coincident with each other, the distance from the CCD to the lens was estimated to be 4060 mm. The distance actually measured with a measuring tape was 4060 mm. When an interference pattern was formed by use of spherical aberration of the optical lens in the aforementioned manner, the distance to the object could be measured.

(Embodiment 2)

FIG. 2 is a view showing another embodiment of the position measuring system according to the invention. This embodiment is provided for forming interference by use of a bifocal lens to thereby perform position measurement. The position measuring system includes a laser light source 1 for radiating a laser beam, a bifocal lens 2a for forming an interference fringe pattern on an object on the basis of the laser beam having passed through different optical paths, a CCD 3 for detecting the interference pattern, and an arithmetic unit 30 for calculating the position of the light source or the object (CCD) on the basis of a signal issued from the CCD.

Figure 5A:
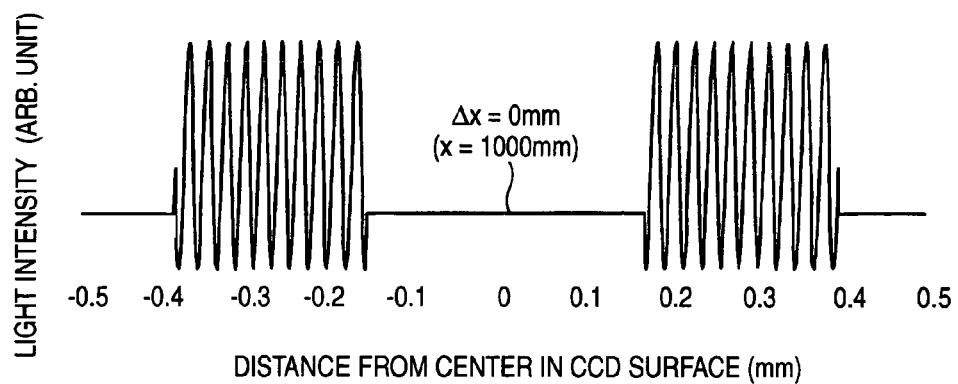
FIGS. 5A and 5B are views showing a result of simulation due to a bifocal lens in the case where a light source moves in a direction parallel to the optical axis.
Figure 5B:
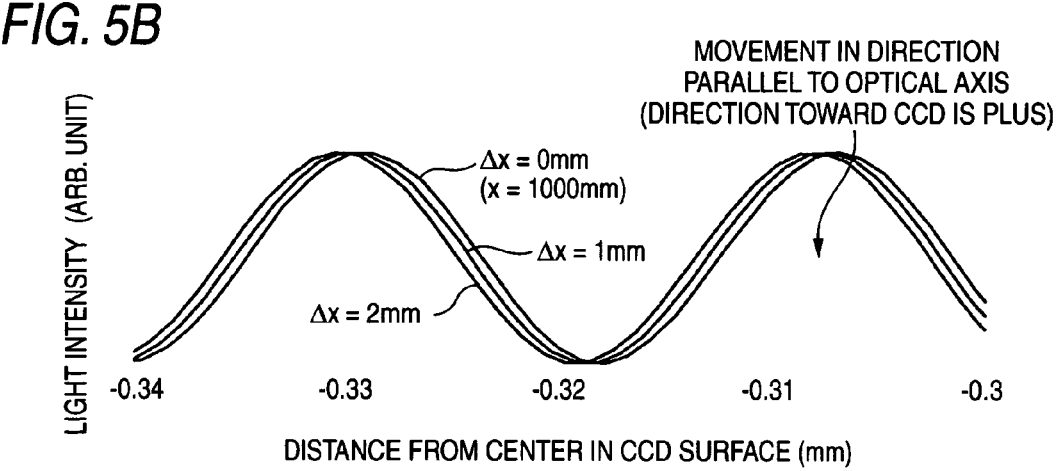

In this case, as shown in FIG. 2, light having passed through the lens crosses the optical axis and forms an interference pattern on the opposite side of the lens. In this embodiment, the laser light source 1, the bifocal lens 2a and the CCD photo acceptance element 3 are disposed on an optical axis. FIGS. 5A and 5B show results of simulation of the intensity of light on the CCD in the case where the laser light source is disposed on the optical axis and at a distance of 1000 mm from the bifocal lens. The lens used was the bifocal lens as shown in FIG. 2 and had an inner lens region near the optical axis, and an outer lens region surrounding the outside of the inner lens region. The inner lens region had a diameter of Φ12 mm and a front curvature radius r1 of 30 mm convex. The outer lens region had a diameter of Φ24 mm and a front curvature radius r2 of 31 mm convex. In each of the inner and outer lens regions, the curvature radius r3 of the rear surface was 30 mm convex. The refractive index of the lens was 1.4. The maximum thickness of the lens was 10 mm (on the optical axis). The CCD 3 was disposed at a distance of 78 mm from the rear surface of the lens. A semiconductor laser at a wavelength of 780 nm was used as the light source. Because a collimating lens or the like was not disposed in the output port of the semiconductor laser, the laser beam was radiated at a horizontal spread angle of 12° and at a vertical spread angle of 25°.

In FIG. 5A, the horizontal axis shows the distance (mm) from the center of the lens in the CCD surface, and the vertical axis shows light intensity (arb. unit). The origin O of the horizontal axis is the center of the CCD on the optical axis. Because only a part of light having passed through the inner lens region can reach a portion of the CCD near the optical axis, interference of light does not occur in the origin O. A part of light having passed through the outer lens region, however, can reach the CCD at a distance of about 0.17 mm or longer from the center, so that the part of light having passed through the outer lens region overlap the part of light having passed through the inner lens region to thereby generate interference. Because the part of light having passed through the inner lens region cannot reach the CCD at a distance longer than about 0.4 mm from the center, interference is terminated at the distance of about 0.4 mm. All parts of light on the outside of the point at the distance of about 0.4 mm are parts of light having passed through the outer lens region. Because the lens has rotational symmetry with respect to the optical axis, the interference pattern shown in FIG. 5A is shaped like a ring.

FIG. 5B is an enlarged view showing a part of FIG. 5A. FIG. 5A shows a result of simulation in the case where the laser light source is disposed on the optical axis (y=0) and at a distance of 1000 mm (x=1000 mm) from the lens. FIG. 5B is a view showing the change of the interference pattern on the CCD in the case where the x-coordinate moves toward the lens by 1 mm and 2 mm successively.

First, as is obvious from FIG. 5B, the period (interval) between adjacent interference fringes is 20 μm or longer, so that the interference pattern can be sufficiently grasped by the general CCD having pixels arranged at intervals of a pitch of several microns. When the light source is brought near to the lens by 1 mm and 2 mm successively, the interference fringes on the CCD move away from the center of the CCD, that is, in the minus direction of the horizontal axis in FIG. 5B successively. This indicates that the rings of the interference fringes are enlarged. In each of pixels in the CCD, 100 or more gradations can be taken sufficiently as variations in quantity of light. Accordingly, when the change in quantity of light is grasped by the CCD, the x-coordinate can be read.

Figure 6:
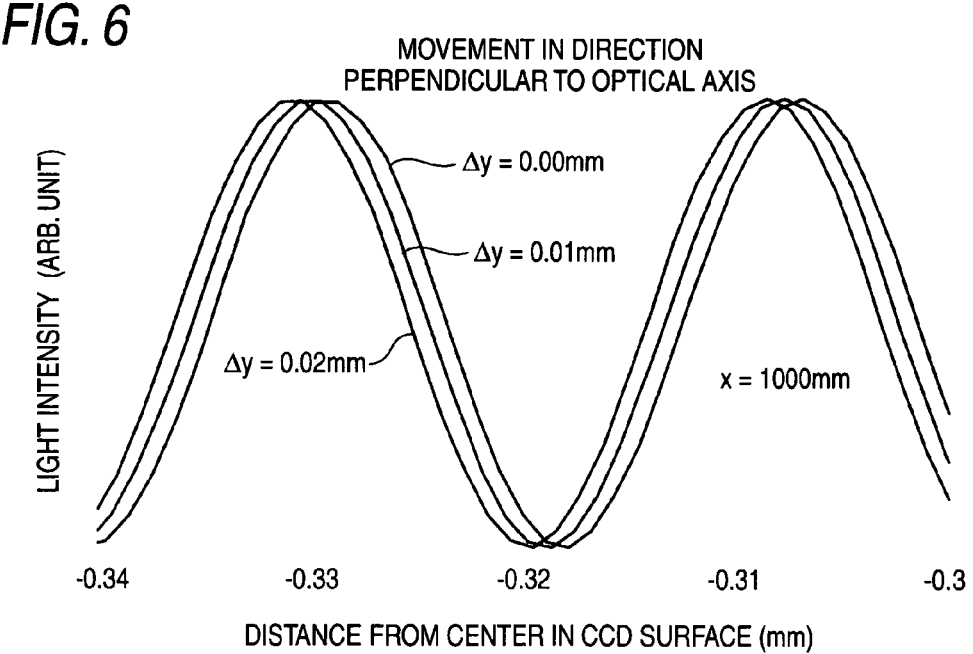
FIG. 6 is a view showing a result of simulation due to the bifocal lens in the case where the light source moves in a direction perpendicular to the optical axis.

FIG. 6 shows a result of simulation in the case where the light-emitting point moves in a direction perpendicular to the optical axis. The lens used, the arrangement of the light source, the arrangement of the CCD, and so on, are the same as those in FIG. 5A except that only the moving direction of the light source is set to be an upper direction (the plus direction of the y-axis) perpendicular to the optical axis. The interference fringes on the CCD move largely by about 9 μm and 18 μm successively in the minus direction though the light source moves only by very small values of 0.01 mm and 0.02 mm successively. Although the horizontal axis in FIG. 6 shows only a range of from −0.34 mm to −0.30 mm, the moving direction of the interference fringes is also the minus direction in the case of a range of from +0.30 mm to +0.34 mm. This indicates that the rings of the interference fringes collectively move in the minus direction.

When the light source is moved up by 0.01 mm, the position of the center of gravity of the interference fringes as a whole moves down by 0.01 mm×78 mm/1000 mm=0.78 μm. Because the interference fringes move by 9 μm, the movement of each of the interference fringes changes more sensitively than ten times or more as large as the movement of the position of gravity of the interference fringes as a whole. This indicates that each of the interference fringes moves greatly like a wave even in the case where the position of the center of gravity of the interference fringes as a whole moves slightly. This means that position measuring sensitivity is improved. Although there is a possibility that this sensitivity cannot be improved so greatly according to the specification of the lens system, there is also a merit that the position of each of the interference fringes can be detected easily by the CCD because the quantity of light in the interference fringes is clearly divided into "0" and "1".

When the light source is moved in the x-direction, that is, in a direction parallel to the optical axis, the interference rings are scaled up/down. On the other hand, when the light source is moved in the y-direction, the interference rings collectively move along the y-axis. In this manner, the x-coordinate and the y-coordinate of the light source can be discriminated from each other on the basis of the change of the shape of the interference rings as a whole. That is, the x-coordinate and the y-coordinate can be obtained. Because the z-coordinate can be obtained in quite the same manner as the y-coordinate, it is to be understood that the three-dimensional position expressed by the x-coordinate, the y-coordinate and the z-coordinate can be measured.

As described above, it has been found that three-dimensional measurement can be performed by use of an optical interference system having a single lens and a CCD.

Although this embodiment has been described upon the case where the positional change of the light source is measured, it is a matter of course that the position of the photo acceptance element can be measured when the light source and the lens system are fixed.

(Embodiment 3)

Figure 7A:
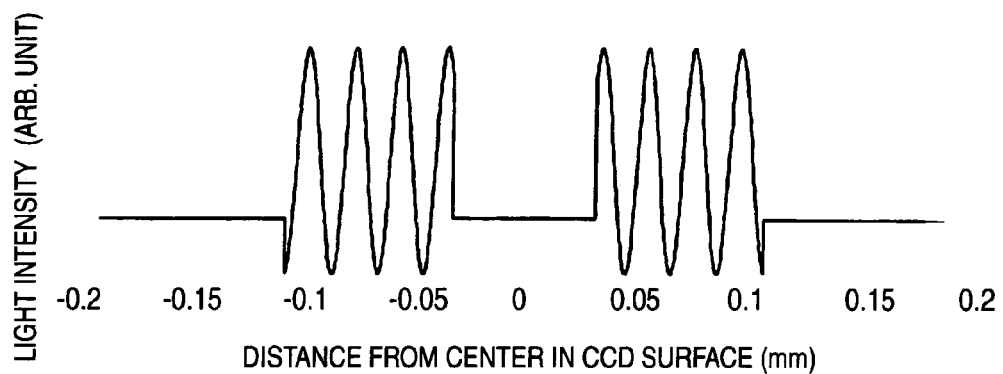
FIGS. 7A and 7B are views showing a result of simulation due to the bifocal lens in the case where the light source moves in a direction perpendicular to the optical axis.
Figure 7B:
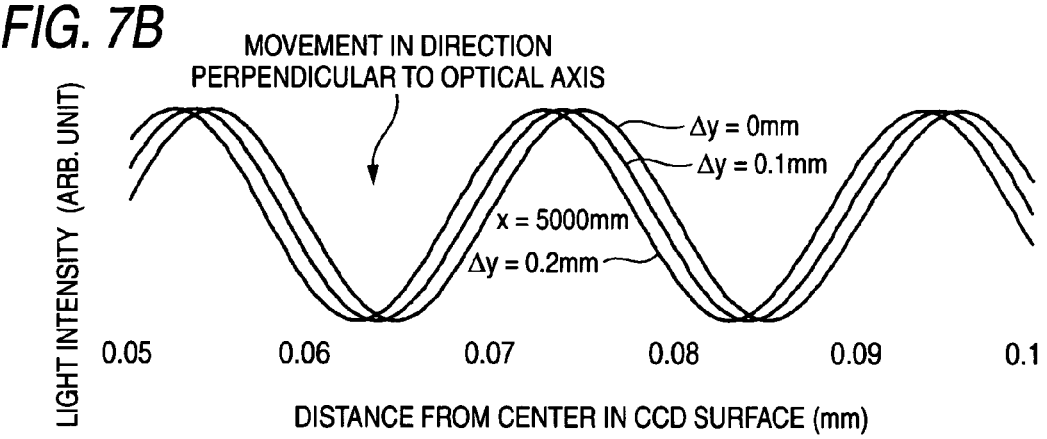

Embodiment 3 shows the case where the position of the light source at a distance of 5 m can be measured accurately by use of a bifocal lens. In FIGS. 7A and 7B, there was used a bifocal lens having a refractive index of 1.4 and being composed of an inner lens region having a diameter of Φ6 mm and a front curvature radius of 39.5 mm, and an outer lens region having a diameter of Φ12 mm and a front curvature radius of 41 mm. The rear surface of the lens had a curvature radius of 41 mm both in the inner lens region and the outer lens region. The maximum thickness (the thickness on the optical axis) of the lens was set at 7 mm. The CCD was disposed at a distance of 51 mm from the rear surface of the lens. A semiconductor laser at a wavelength of 780 nm was used as the light source. First, the light source was placed on the optical axis and at a distance of 5000 mm from the front surface of the lens. FIG. 7A shows the interference pattern of light formed on the CCD on this occasion. The interference pattern was observed as a ring-like pattern having bilateral symmetry. The interval between adjacent interference fringes was about 25 μm and could be observed by a general CCD. Then, the light source was moved up (in the plus direction of the y-axis) by 0.1 mm and 0.2 mm successively. FIG. 7B shows the change of the pattern of optical interference fringes on this occasion. When the light source was moved up by a slight distance of 0.1 mm, the sharp pattern of interference fringes on the CCD moved though the pattern of optical interference fringes was at a distance of 5 m from the lens. In FIG. 7B, the horizontal axis shows a range of from 0.05 mm to 0.1 mm. The interference fringes moved in the minus direction by about 1 μm at a time. It is reasonable that the interference fringes move in the minus direction of the y-axis when the light source is moved in the plus direction of the y-axis. If a CCD having pixels arranged at intervals of a pitch of 5 μm is used, the change of the quantity of light can be detected sufficiently because the change of the quantity of light is in a range of from about 10% to about 20% when the interference fringes move by 1 μm.

As described above, it has been found that this embodiment is so high in sensitivity that the movement of the light source at a distance of 5 m can be observed even in the case where the light source moves slightly by 0.1 mm in a direction perpendicular to the optical axis.

(Embodiment 4)

A method for measuring the position of a light source by use of spherical aberration of a simple spherical lens will be described on the basis of this embodiment.

Figure 8:
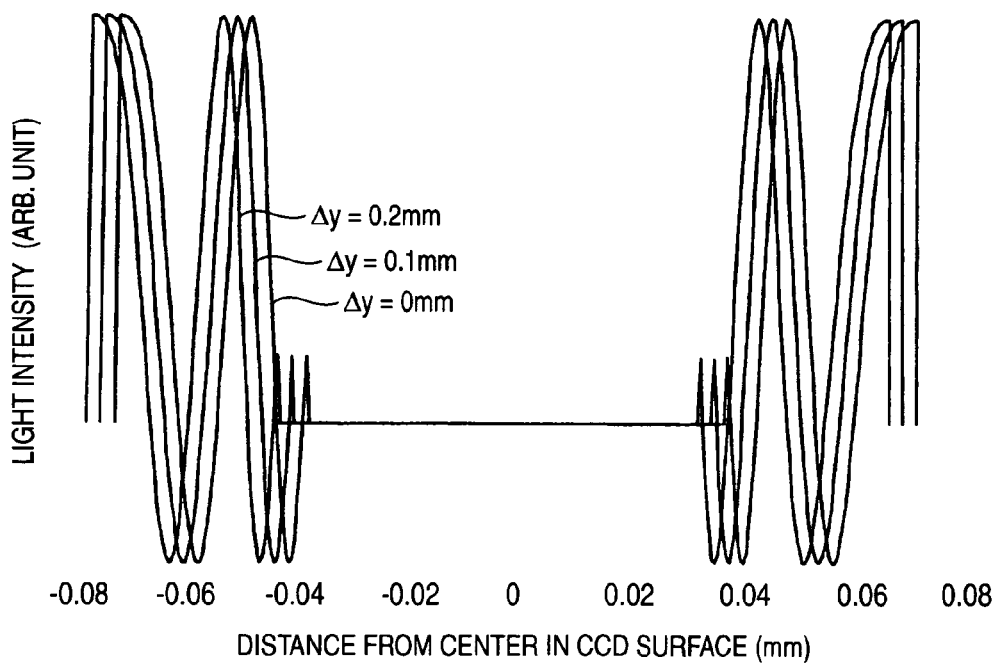
FIG. 8 is a view showing a result of simulation due to a single-focus spherical lens.

In this embodiment, a simple spherical lens was used. The diameter of the lens was Φ20 mm. The front surface of the lens had a curvature radius of 50 mm. The rear surface of the lens was flat. The maximum thickness of the lens was 10 mm. The light-emitting point was placed on the optical axis and at a distance of 5000 mm from the front surface of the lens. The distance between the rear surface of the lens and the CCD was set at 119 mm. A semiconductor laser at a wavelength of 780 nm was used as the light source. While the light source was moved by 0.1 mm and 0.2 mm successively in an upward direction (plus direction of the y-axis) perpendicular to the optical axis, the light quantity distribution formed on the CCD was simulated. As a result, a pattern of interference fringes as shown in FIG. 8 was observed. The characteristic in the case where such a simple lens is used is that the outermost circumference of the interference fringe pattern always exhibits a peak of the quantity of light. In the optical path diagram shown in FIG. 1A, the position of light applied on the CCD first moves in the plus direction of the y-axis when light emitted from the light source passes through a point slightly far from the lens center (in the plus direction of the y-axis) but the position of light applied on the CCD moves down when light emitted from the light source passes through a point higher than a certain point of the lens in the y-axis. This turnover point corresponds to the outermost circumference of the interference fringes. Accordingly, there is the characteristic that the interference fringe pattern can be recognized easily.

The lens used in this embodiment is a spherical lens which has a flat rear surface and a concave front surface and which is very simple. Such a simple lens has a merit that the lens can be produced easily and inexpensively compared with a Fresnel lens.

As described above, it has been found that even in the case where a simple spherical lens is used, the displacement of the light source at a distance of 5 m from the lens can be measured on the basis of the interference fringe pattern on the CCD when the light source moves slightly by about 0.1 mm in a direction perpendicular to the optical axis. It has been found that a low-cost high-sensitive position measuring system can be produced. When the light source was moved in a direction parallel to the optical axis in the same condition, the change of the interference fringes was so little that the sensitivity of position detection was low.

(Embodiment 5)

Figure 9:
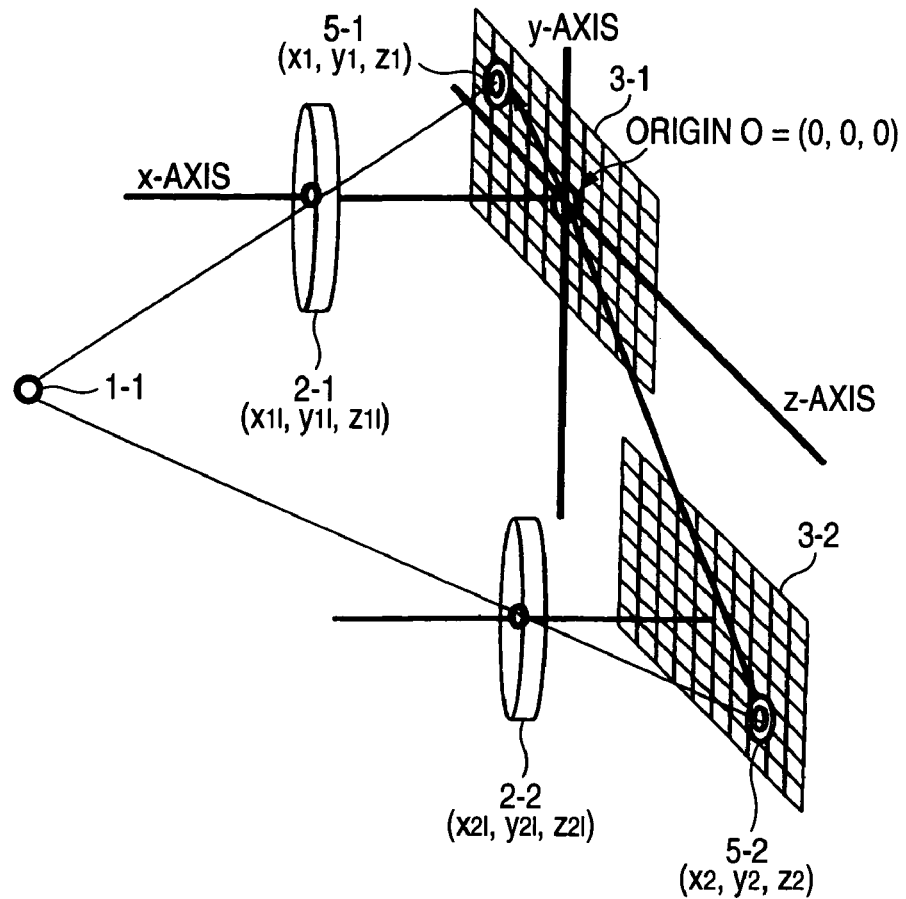
FIG. 9 is a view showing the principle of three-dimensional position measurement by a triangulation method.

The case where three-dimensional position measurement is performed by use of the characteristic of high-sensitive detection in a direction perpendicular to the optical axis as described in Embodiment 4 will be described in this embodiment. Two CCD cameras are used as units for detecting the interference pattern. FIG. 9 shows a method for measuring the three-dimensional position by a general triangulation method. An image of a light source 1-1 as an object is picked up by two CCD cameras 3-1 and 3-2 which are provided so that the positional relation between the two CCD cameras 3-1 and 3-2 is known. Two-dimensional positions 5-1 and 5-2 of the projected image of the object 1-1 on pixels are specified. When the coordinates of the two-dimensional positions 5-1 and 5-2 are $(x_1, y_1, z_1)$ and $(x_2, y_2, z_2)$ respectively and the coordinates $(x, y, z)$ of the effective centers of two lenses 2-1 and 2-2 are $(x_{11}, y_{11}, z_{11})$ and $(x_{21}, y_{21}, z_{21})$ respectively, the coordinates of the object can be expressed by the following formulas because lines connecting the lens centers and the object pass through the points 5-1 and 5-2 on the CCDs respectively.

$$\begin{bmatrix} x \\ y \\ z \end{bmatrix} = \begin{bmatrix} x_1 \\ y_1 \\ z_1 \end{bmatrix} + m_1 \begin{bmatrix} x_{1l} - x_1 \\ y_{1l} - y_1 \\ z_{1l} - z_1 \end{bmatrix} \quad (3)$$

$$\begin{bmatrix} x \\ y \\ z \end{bmatrix} = \begin{bmatrix} x_2 \\ y_2 \\ z_2 \end{bmatrix} + m_2 \begin{bmatrix} x_{2l} - x_2 \\ y_{2l} - y_2 \\ z_{2l} - z_2 \end{bmatrix} \quad (4)$$

In the formula (3), $m_1$ is a value obtained by dividing the length of a line segment connecting the object 1-1 and the point 5-1 on the first CCD 3-1 by the length of a line segment connecting the point 5-1 and the effective center point of the lens 2-1. In the formula (4), $m_2$ is a value obtained by applying the same calculation to the second CCD 3-2. The five variables x, y, z, $m_1$ and $m_2$ can be calculated on the basis of six equations given by the formulas (3) and (4). Accordingly, the three-dimensional coordinates $(x, y, z)$ of the object can be obtained. In the three-dimensional position measuring method heretofore used, resolving power basically depends on the density of pixels of the CCD. As described preliminarily in the related art, when the object is at a distance of 1 m, resolving power is only about 1 mm. To eliminate this disadvantage, the interference measurement method according to the invention can be used. In the optical interference measurement method according to the invention, the displacement of the object at a distance of several meters can be detected even in the case where the object moves by about 0.1 mm in a direction (y-axis direction) perpendicular to the optical axis. When only the displacement of the object in the direction perpendicular to the optical axis is used for performing three-dimensional position measurement by a triangulation method shown in FIG. 9, position measurement can be performed with very high resolving power.

(Embodiment 6)

Figure 10:
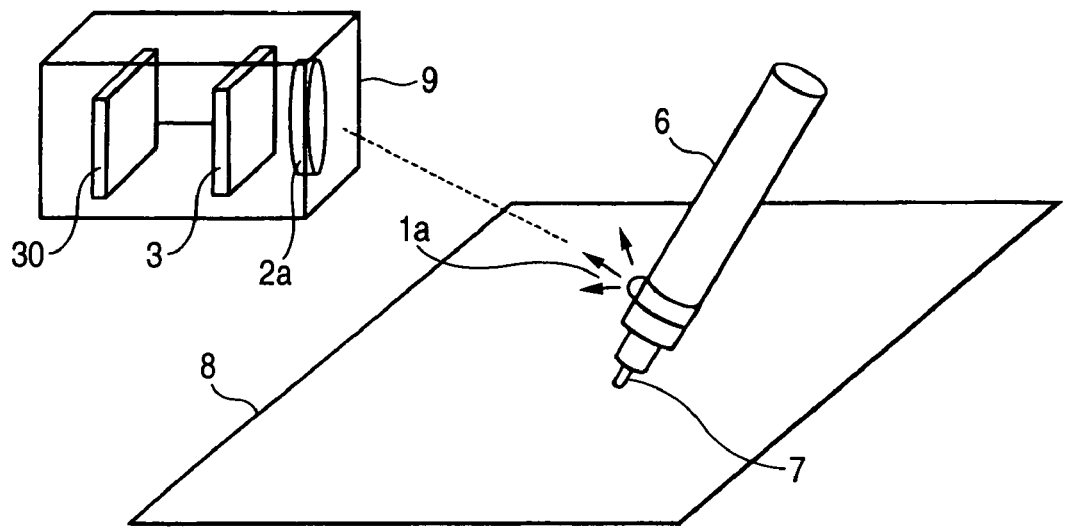
FIG. 10 is a view showing an embodiment of a character entry unit using a light-emitting pen.

FIG. 10 is a view showing an embodiment of a character entry unit using the position measuring system according to the invention. In this embodiment, as shown in FIG. 10, a small stem can 1a mounted with a laser chip is mounted in a neighbor of a pen point 7 of a general ball point pen 6 or the like. The direction of the laser beam emitted at a wide spread angle is set to be perpendicular to the long axis of the pen so that the light beam can reach a photo acceptance element array (CCD) 3 easily when the pen rotates. The laser beam emitted from the semiconductor laser chip is generally spread at an angle of ten and several degrees in the horizontal direction and at an angle of twenty and several degrees in the vertical direction. An optical lens 2a for forming interference is disposed in front of the photo acceptance element array 3. The pen point 7 is quite the same as a ball point of a general ball point pen, so that a character can be written with the pen point 7. A spring switch is incorporated in the light-emitting pen 6 so that the laser beam can be emitted on the basis of pressure generated when a character is written. That is, only when a character is written actually, interference fringes are formed on the CCD 3. An arithmetic unit 30 calculates the three-dimensional position of the pen on the basis of the interference fringes formed on the CCD 3. For example, the arithmetic unit 30 inputs this information to a computer not shown, so that this information can be indicated as a character on a display. Because the pen moves on a certain plane such as a notebook 8, a character written on the notebook can be input accurately when the locus of the three-dimensional position of the pen is projected onto this plane while this plane is calculated.

(Embodiment 7)

Figure 11:
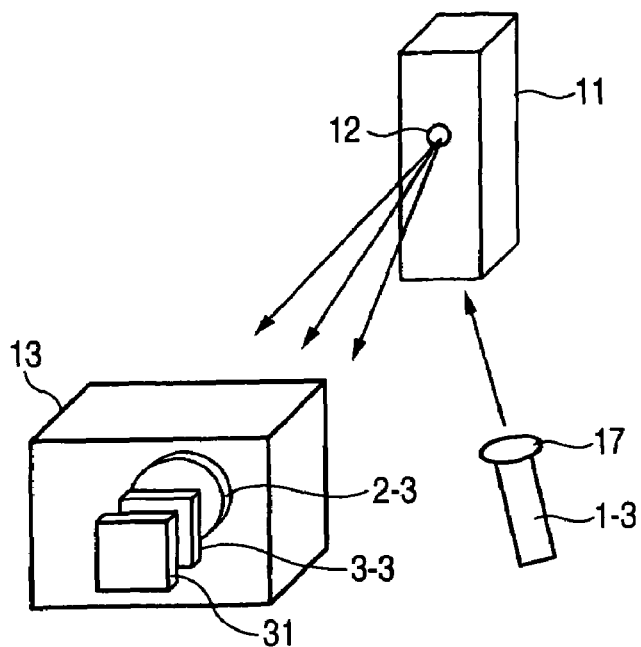
FIG. 11 is a view showing an embodiment of position measurement in the case where a high reflectance member is stuck onto an object.

FIG. 11 is a view showing a further embodiment of the position measuring system according to the invention. In this embodiment, as shown in FIG. 11, the position measuring system includes a light source 1-3 for radiating a laser beam, a condensing lens 17 (irradiator) for applying the laser beam onto an object 11 so that the laser beam is reflected by the object 11, an optical lens system 2-3 for forming an interference pattern on the basis of the reflected laser beam having passed through different optical paths, a detector 3-3 for detecting the interference pattern, and an arithmetic unit 31 for calculating the position of the light source, the object or the detector on the basis of a signal issued from the detector.

This embodiment shows the case where a high reflectance member 12 is stuck onto the object 11 and the distance between the object 11 and the CCD photo acceptance element array 3-3 is measured. A Φ5 mm stainless steel ball having the gloss of metal was used as the high reflectance member 12. As shown in FIG. 11, the high reflectance member 12 was disposed on the object 11 at a distance of several meters. The stainless steel ball 12 was irradiated at the laser beam emitted from the semiconductor laser 1-3 at a wavelength of 650 nm and condensed by the condensing lens 17. The reflected laser beam from the stainless steel ball was observed by the CCD photo acceptance element array 3-3 through the interference lens 2-3. A filter for transmitting only the laser beam at a wavelength of 650 nm was disposed in the CCD photo acceptance element array 3-3 so that all light beams except the laser beam were cut off. The interference fringe pattern was substantially equivalent to a pattern obtained in the case where the reflecting member 12 was replaced by a point light source. The arithmetic unit 31 calculated the three-dimensional position of the object 11 on the basis of the interference fringes formed on the CCD photo acceptance element array 3-3. Accordingly, the position of the reflecting member could be measured accurately.

Although this embodiment has been described upon the case where the condensing lens 17 is used in irradiation of the laser beam emitted from the laser light source 1-3 for increasing the intensity of the reflected laser beam, it is a matter of course that measurement can be also performed when the laser beam is applied without use of the condensing lens. In addition, in this embodiment, a stainless steel ball is used as the high reflectance member 12. When the high reflectance member 12 is spherical, there is a merit that the reflected laser beam can have the characteristic of the point light source easily.

Any material, however, may be used as the high reflectance member 12 if the material can reflect light. For example, a thin plate-like metal piece may be used as the high reflectance member 12. In this case, the size of a high reflectance portion of the metal piece may be preferably reduced so that the metal piece can reflect light as if the metal piece were a point light source. The diameter of the metal piece may be generally preferably selected to be not larger than Φ0.5 mm. A general wall, pillar or the like maybe also used as the high reflectance member 12. In this case, it is however preferable that the spot size of the irradiated laser beam is narrowed to be not larger than about Φ0.5 mm so that the area of the reflecting portion can be narrowed to make the reflecting portion behave like a point light source. On the other hand, when a reflecting mirror such as a relatively large mirror is disposed on the object, the distance can be also measured. In this case, the measured distance is the distance from the light source to the photo acceptance element array. The positions of the object and the light source need to be grasped. Or, when the laser light source is disposed just beside the CCD, a half of the measured distance can be regarded as the distance to the object.

(Embodiment 8)

Figure 12:
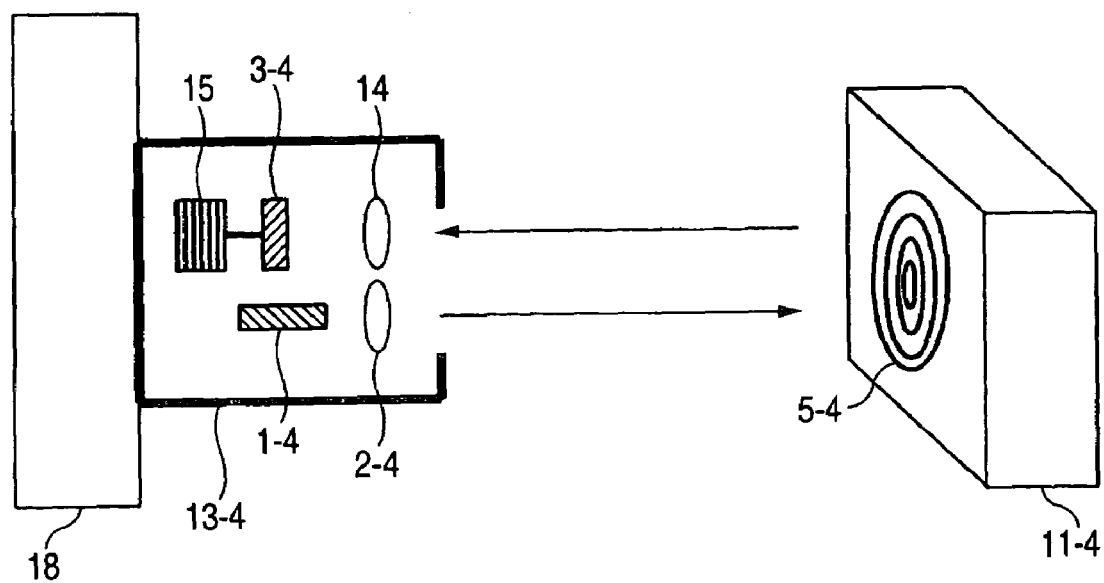
FIG. 12 is a view showing an embodiment of position measurement in the case where an interference pattern is formed on an object.

FIG. 12 is a view showing a further embodiment of the position measuring system according to the invention. This embodiment shows the case where an interference pattern is formed on an object and detected by a CCD camera to thereby measure the distance to the object. In this embodiment, as shown in FIG. 12, all components are mounted in an integral casing 13-4 so that the system can be carried easily. That is, a semiconductor laser 1-4, an optical lens system 2-4 for forming interference, a CCD 3-4, an image-forming optical system 14 by which an image of an interference pattern 5-4 formed on an object 11-4 is formed on the CCD 3-4, and an arithmetic unit 15 for performing position calculation are put in the integral casing 13-4. Because the interference pattern 5-4 formed on the object 11-4 can be expressed uniquely as a function of distance, the position can be decided on the basis of observation of the interference pattern 5-4.

Figure 13:
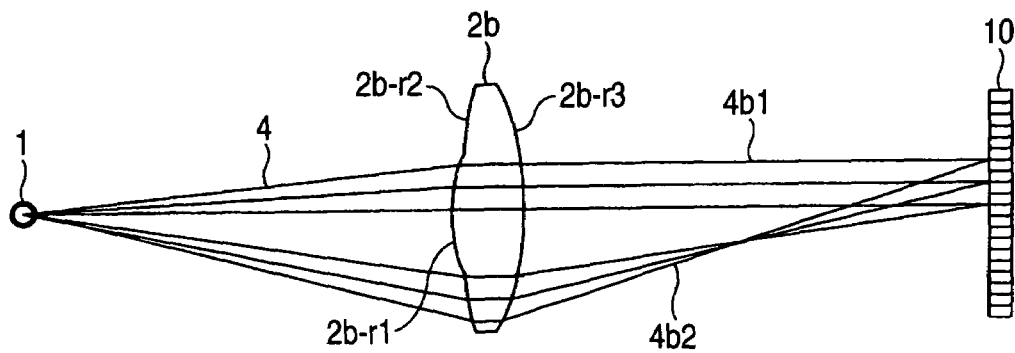
FIG. 13 is a view showing an example of loci of light beams passing through the bifocal lens used in FIG. 12.

In this case, because the interference fringes change sensitively even in the case where the distance to the object is long, a bifocal lens 2b shown in FIG. 13 is used as the optical lens system 2-4. In this lens, a part of light having passed through an inner lens region 2b-r1 of the lens 2b forms a collimated light beam so that the outer diameter of the light beam does not change even in the case where the distance changes. A part of light having passed through an outer lens region 2b-r2 of the lens 2b advances on an optical path 4b2 so that the part of light crosses the optical axis and reaches the object 10 whereas a part of light having passed through the inner lens portion 2b-r1 advances on an optical path 4b1 so that the part of light reaches the object 10. As a result, the two parts of light interferes with each other on the object 10. This structure has the characteristic that the interference fringes can change sensitively because the optical path difference between a part of light having passed through the inner lens region and a part of light having passed through the outer lens region is made conspicuous easily in spite of the delicate displacement of the object 10.

The specification of the bifocal lens 2b shown in FIG. 13 is as follows. The inner lens region 2b-r1 has a diameter of Φ14 mm and a front curvature radius of 200 mm. The outer lens region 2b-r2 has a diameter of Φ24 mm and a front curvature radius of 181 mm. The curvature radius of the rear surface 2b-r3 of the lens is 200 mm in both the inner and outer lens regions. The maximum thickness of the lens is 10 mm. The refractive index of the lens is 1.7. The distance from the front surface of the lens to the output port of the semiconductor laser is 140 mm.

Figure 14:
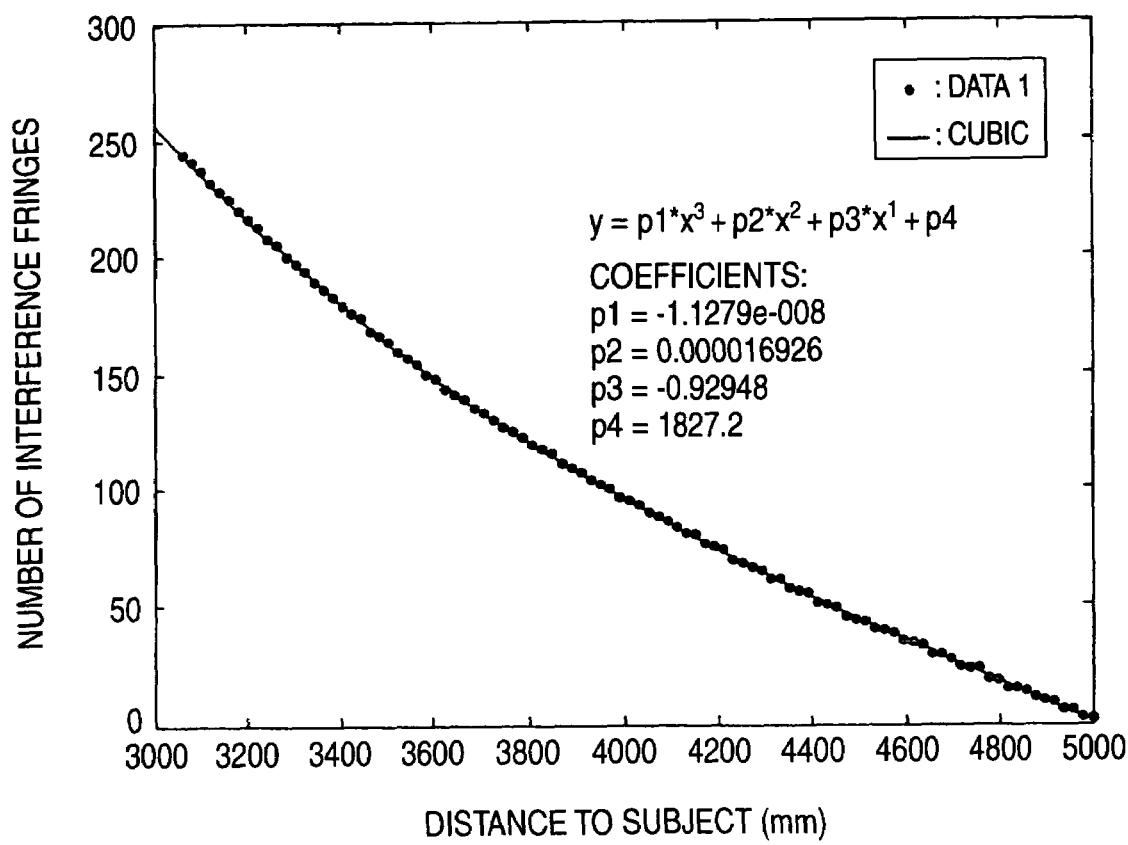
FIG. 14 is a graph showing the relation between the number of interference fringes observed in FIG. 12 and the distance to the object.

FIG. 14 is a graph showing an experimental example in Embodiment 8. In the graph shown in FIG. 14, the horizontal axis shows the distance from the rear surface of the lens to the object, and the vertical axis shows the number of peaks and bottoms (the number of interference fringes) in the interference pattern formed on the object. There is one peak and one bottom in one cycle of the interference pattern. In other words, the vertical axis shows the number of half-periods existing in the interference pattern. The distance to the object is selected to be in a range of from 3007 mm to 5000 mm. It is obvious that the number of interference fringes changes sensitively in accordance with the distance to the object. A curve curve-fitted to the plotted points in the graph can be represented by the equation: $y = p1*x^3 + p2*x^2 + p3*x^1 + p4$ (in which y is the number of half-periods, and x is the distance (mm) to the object). In this case, p1, p2, p3 and p4 take the values: $p1 = -1.1279 \times 10^{-8}$, $p2 = 1.6926 \times 10^{-4}$, $p3 = -0.92948$, and $p4 = 1827.2$. The distance to the object can be measured in accordance with the number of half-periods existing in the interference pattern on the basis of the equation of the curve.

In the measurement of the distance to the object, when the rear surface of the integral casing 13-4 is regarded as a reference, the distance between objects can be measured. When, for example, the rear surface of the integral casing 13-4 is pressed against a pillar 18 shown in FIG. 12 while the object 11-4 is regarded as a pillar, the distance between the pillars can be measured accurately. That is, a portable laser distance meter useful in daily living can be provided.

(Embodiment 9)

Figure 15:
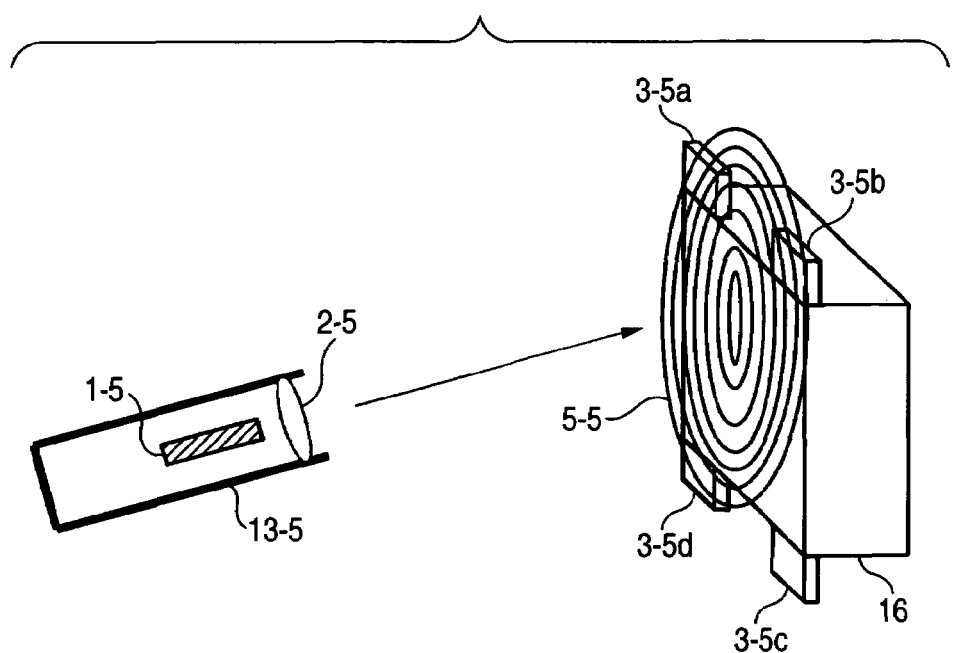
FIG. 15 is a view showing an embodiment of detection of a place indicated by a pointer in the case where an interference pattern is formed on a display.
Figure 16A:
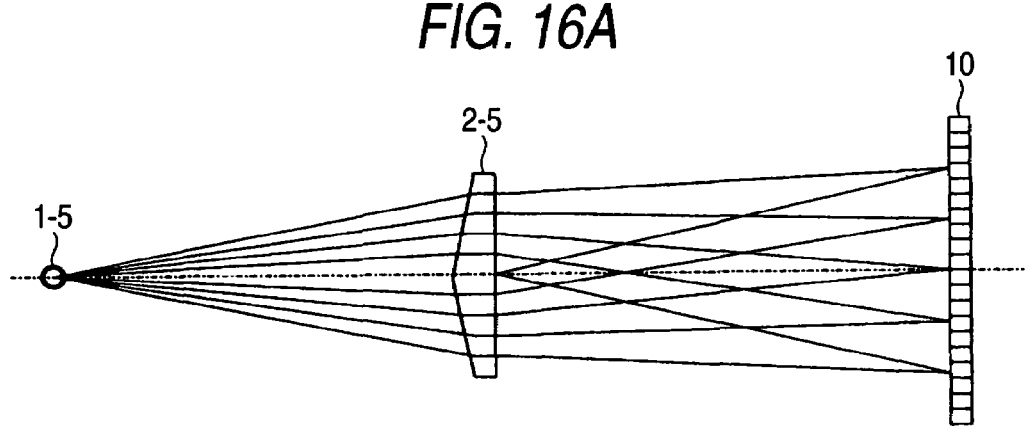
FIG. 16A is a view showing an embodiment in which an interference pattern shaped like concentric circles is formed by use of a conical lens.
Figure 16B:
FIG. 16B is a view showing an example of the conical lens.

FIG. 15 is a view showing an embodiment for detecting a place pointed by a pointer on the basis of an interference pattern formed on a display. In this embodiment, as shown in FIG. 15, CCD photo acceptance element arrays 3–5a, 3–5b, 3–5c and 3–5d are attached to four corners of a 0.9 m-square display 16. A semiconductor laser at a wavelength of 780 nm is used as the light source 1-5. A conical lens 2c having a refractive index of 1.6 as shown in FIG. 16B is used as the optical lens system 2-5 for forming interference. The height 2c–h of a conical portion of the conical lens 2c is 1.1 mm. The thickness of a columnar portion 2c–d of the conical lens 2c is 1.9 mm. Accordingly, the maximum thickness of the lens is 3 mm. The rear surface of the lens is flat. The refractive index of the conical lens 2c is 1.6. The diameter of the conical lens 2c is Φ4 mm. When the conical lens is used, the interference pattern is formed on the basis of loci of light beams shown in FIG. 16A. When the height of the conical lens 2-5 is determined suitably, a part of light having passed through an upper half of the lens and a part of light having passed through a lower half of the lens can be made to overlap each other as shown in FIG. 16A so that the interference pattern can be formed.

In the condition that the distance from the semiconductor laser 1-5 to the front surface (the apex of the cone) of the lens is 10 mm, the semiconductor laser 1-5 and the lens 2-5 are disposed in an integral casing to form a pointer 13-5.

Figure 17A:
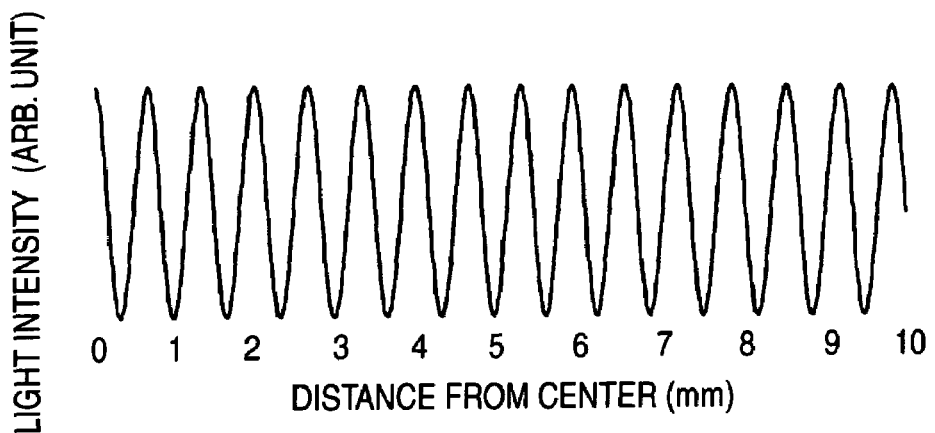
FIGS. 17A and 17B are views showing a result of simulation of an interference pattern shaped like concentric circles and formed by the conical lens.
Figure 17B:
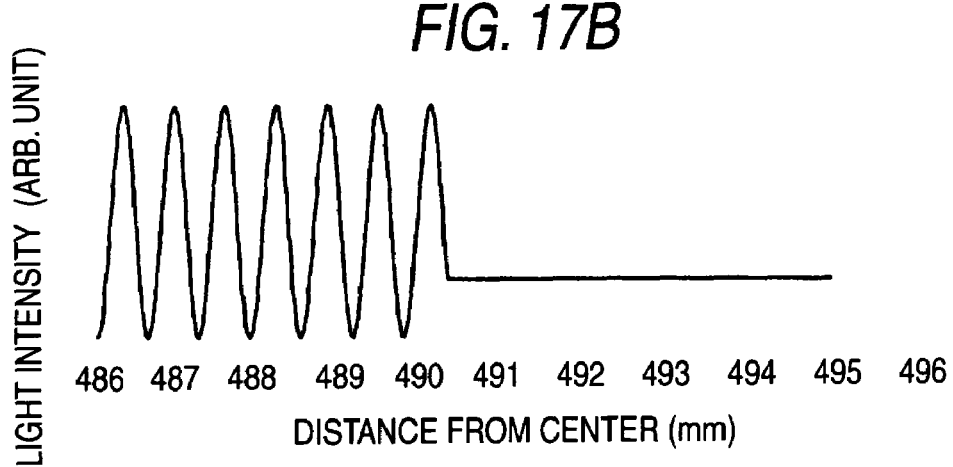

When a display 16 at a distance of 3 m from the pointer 13-5 is perpendicularly irradiated with a laser beam, interference fringes 5-5 are formed as concentric circles arranged in good order. The diameter of the outermost circumference of the concentric circles is about Φ1.0 m. FIGS. 17A and 17B show this interference fringe pattern. FIG. 17A shows the interference fringes in a region near the center of the concentric circles. FIG. 17B shows the interference fringes in a region near the outermost circumference of the concentric circles. The pitch of the interference fringes in FIG. 17A is about 0.67 mm whereas the pitch of the interference fringes in FIG. 17B is about 0.63 mm. Because the size of the display 16 is 0.9 m×0.9 m, the CCD photo acceptance element array 3-5 can always detect a part of the interference fringes as concentric circle when a position in the display 16 is pointed by the pointer 13-5.

Because a line normal to a circular arc in each of the concentric circles always passes through the center of the concentric circles, the position of the center of the concentric circles can be calculated on the basis of lines normal to two or more circular arcs. If only one circular arc is provided, the circular arc may be divided into two circular arcs so that the position of the center of the concentric circles can be calculated on the basis of lines normal to the two circular arcs. If the interference fringes are formed obliquely on the display, an angle of inclination may be calculated on the basis of the deformation state of a circular arc in each of the interference fringes so that the position of the center of the interference fringes can be calculated in the same manner as described above. Because the center point of the interference fringes is quite equal to the position pointed by the pointer 13-5, the pointer 13-5 can be used as an input interface of a computer when a cursor is moved to this position.

If a switch for changing the pulse light-emitting time of the light source 1-5 is attached to the pointer 13-5 so that the change of the pulse light-emitting time can be detected by the CCD photo acceptance element array, the clicking operation of a mouse can be carried out by the switch attached to the pointer.

(Embodiment 10)

Figure 18:
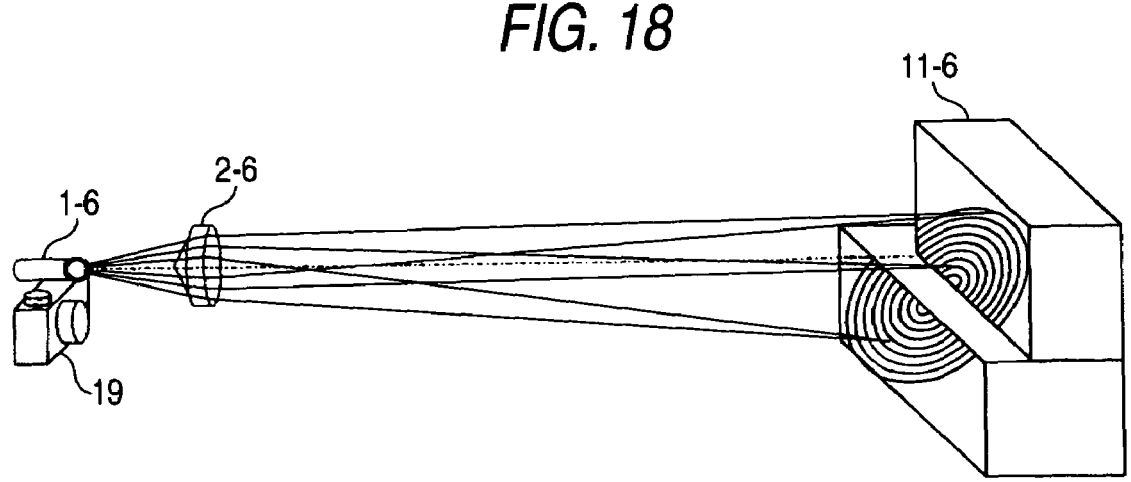
FIG. 18 is a view showing an embodiment for projecting an interference pattern shaped like concentric circles onto an object to thereby acquire a distance image.

FIG. 18 is a view showing an embodiment for measuring a distance by projecting an interference pattern of concentric circles onto an object. This embodiment will be described as an embodiment in which a conical lens is used for projecting an interference pattern of concentric circles onto an object to thereby measure the distance to the object on the basis of the interval between adjacent ones of the interference fringes.

As shown in FIG. 18, a semiconductor laser 1-6 is used as the laser light source. A conical lens is used as the optical lens system 2-6 for forming interference. Interference fringes shaped like concentric circles are formed on an object. Because the unevenness of the object forms a difference between distances from the conical lens, the pitch of the interference fringes as concentric circles varies according to the unevenness of the object. An image of the interference pattern is picked up by a measuring camera 19, so that the pitch of the interference fringes is measured to thereby calculate the distance to the object. The measurement of the interference fringe pitch can be performed easily on the basis of the optical magnifying power of the measuring camera and the image of the interference fringes. In this case, the size of the object for use in distance measurement is determined by the interference fringe pitch. Because the interference fringe pitch can be changed optionally in accordance with design of the conical lens, a conical lens capable of forming a narrow interference fringe pitch can be used when the unevenness of the object is fine whereas a conical lens capable of forming a wide interference fringe pitch can be used when the unevenness of the object is rough.

Although this embodiment has been described upon the case where a conical lens is used for forming interference fringes as concentric circles, such an interference pattern can be formed also when a triangular prism is used. The triangular prism is formed so that the triangle of the triangular prism is an isosceles triangle having a height of 1.1 mm and a bottom length of 4 mm in the same manner as in Embodiment 9. When the laser light source is disposed on the apex side of the triangular prism, the interference pattern can be formed on the object. In this case, the interference pattern forms not concentric circles but linear vertical stripes. When the interval between adjacent ones of the vertical stripes is read by a sensor, the distance can be calculated.

In the measurement of the distance, light at a certain wavelength may be absorbed to the object without reflection in accordance with the material of the object. In this case, it may be difficult for the CCD photo acceptance element array to observe the interference pattern formed on the object. In such a case, the problem can be avoided when light at a wavelength easy to be reflected by the object is used.

(Embodiment 11)

Figure 19:
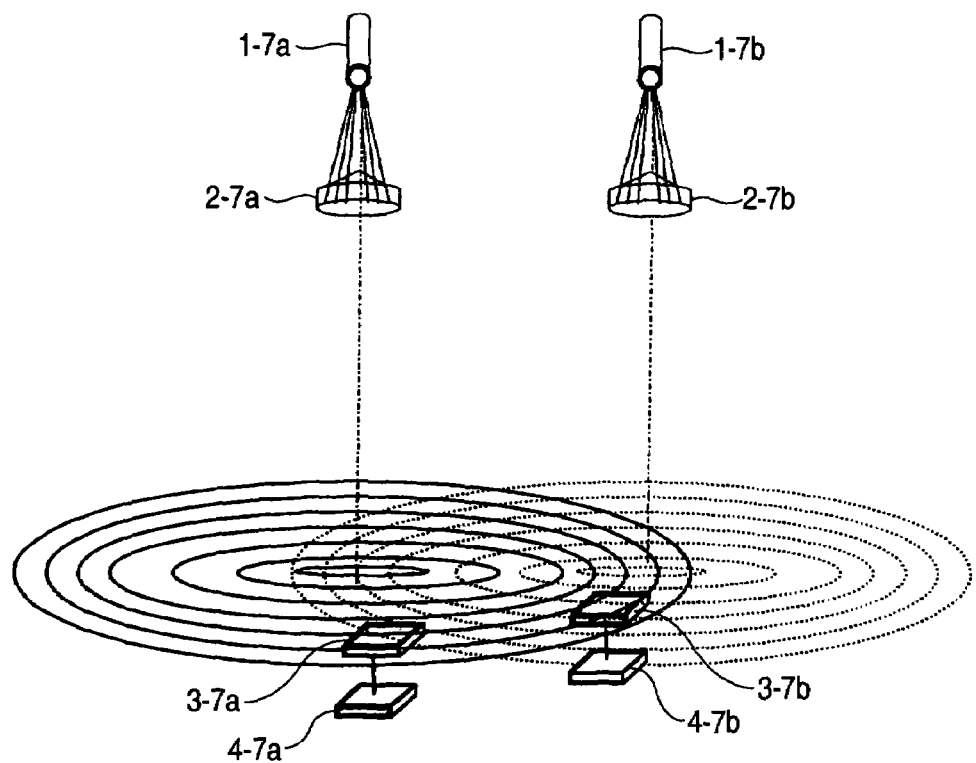
FIG. 19 is a view showing an embodiment in which two sensors measure their own positions on the basis of two interference patterns each shaped like concentric circles.

FIG. 19 is a view showing an embodiment in which sensors measure their own positions on the basis of two interference patterns each shaped like concentric circles. This embodiment will be described as an embodiment in which a plurality of laser light sources at different wavelengths and a plurality of conical lenses are used for projecting a plurality of interference patterns each shaped like concentric circles so that a part of the interference fringes is detected by a plurality of CCDs to thereby measure the respective positions of the CCDs. As shown in FIG. 19, a semiconductor laser 1–7a at a wavelength of 630 nm and a semiconductor laser 1–7b at a wavelength of 780 nm are attached to a ceiling. A conical lens 2–7a and a conical lens 2–7b are provided in front of the semiconductor lasers 1–7a and 1–7b respectively so that interference patterns different in wavelength and each shaped like concentric circles are formed on the whole surface of a floor. Two CCD sensors 3–7a and 3–7b disposed on the floor can detect a light beam at a wavelength of 630 nm and a light beam at a wavelength of 780 nm individually. The CCD sensors can detect circular arcs of the concentric circles. Two arithmetic units 4–7a and 4–7b can calculate the center pints of the concentric circles. Because the positions of the laser light sources 1–7a and 1–7b are known in advance, the positions of the centers of the concentric circles are known. Accordingly, the positions of the CC sensors 3–7a and 3–7b can be calculated on the basis of the theory of triangulation.

When such a CCD sensor is attached to a head of a robot, the robot can find its own position in a room easily. Also when a plurality of robots are in the room, the robots can find their own positions in this manner. There is the characteristic that the robots can do group work in cooperation without any contact with one another.

(Embodiment 12)

Figure 20A:
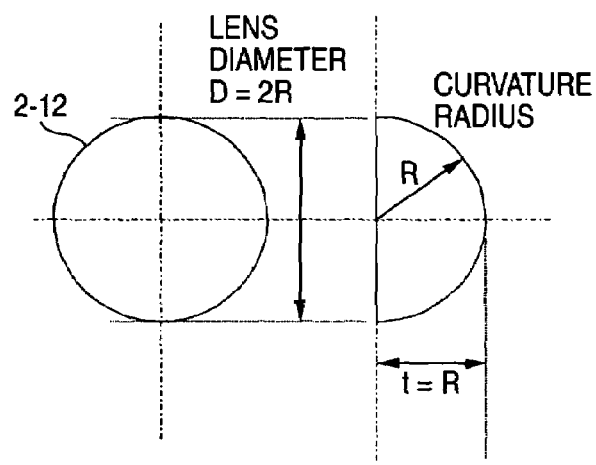
FIGS. 20A and 20B are views showing the shape of a hemisphere lens.
Figure 20B:
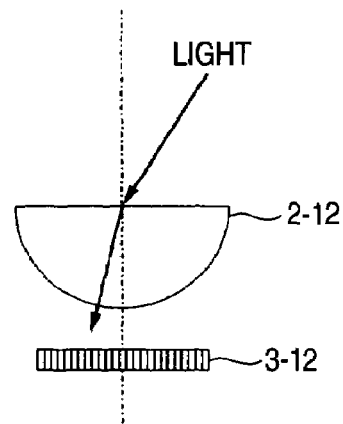

Embodiment 12 is provided for measuring the position of a semiconductor laser light source by use of a hemisphere lens as an optical lens for forming interference of light on the basis of spherical aberration of the lens. FIGS. 20A and 20B are views showing the shape of a hemisphere lens with a curvature radius R. As shown in FIG. 20A, the hemisphere lens 2-12 is shaped so that a sphere is divided into two.

When this lens is used, incident light input to the center point of a first surface of the lens is refracted to reduce the angle between the light and the optical axis but the refracted light moves straightly without refraction because the refracted light is perpendicularly input to a second surface of the lens, as shown in FIG. 20B. Because such an optical path is formed, a pattern of interference of light can be formed on the photo acceptance element array 3-12 even in use of a light source with a wide angle of view when the hemisphere lens is used.

Figure 21:
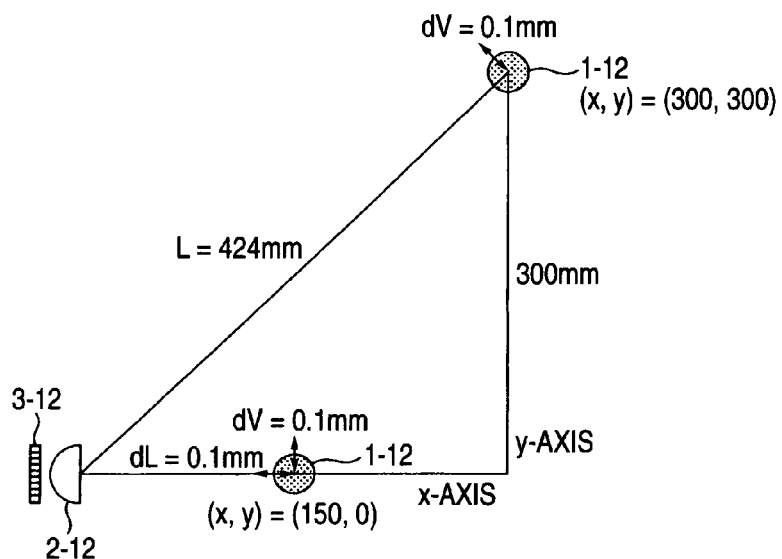
FIG. 21 is a view showing the position of a light source in an x-y plane.

Next, a result of simulation for measuring the position of each light source 1-12 by use of the hemisphere lens 2-12 will be described. FIG. 21 is a view showing the position of each light source in an x-y plane. The specification of the hemisphere lens 2-12 is as follows. The refractive index of glass used in the lens is 1.85. The lens has a first surface which is flat, and a second surface which has a curvature radius R of 30 mm. An aperture with a diameter of 32 mm is provided as a stop on the first surface of the lens. The CCD photo acceptance element array 3-12 is a line sensor having 10000 pixels arranged one-dimensionally at intervals of a pitch of 3.5 µm. The CCD photo acceptance element array 3-12 is disposed in a position at a distance of 8 mm from the second surface of the lens so as to be perpendicular to the optical axis. Semiconductor laser light sources 1-12 at a wavelength of 780 nm are used. As shown in FIG. 21, the semiconductor laser light sources 1-12 are disposed in two positions (150, 0) and (300, 300) (unit: mm) respectively. The semiconductor laser light sources 1-12 are moved slightly by 0.1 mm from these positions. In FIG. 21, the optical axis of the lens is taken as the x-axis, and an axis perpendicular to the optical axis and on a plane of paper on which FIG. 21 is written is taken as the y-axis. A point of intersection between the optical axis and the first surface of the lens is taken as the origin (0, 0).

Figure 22A:
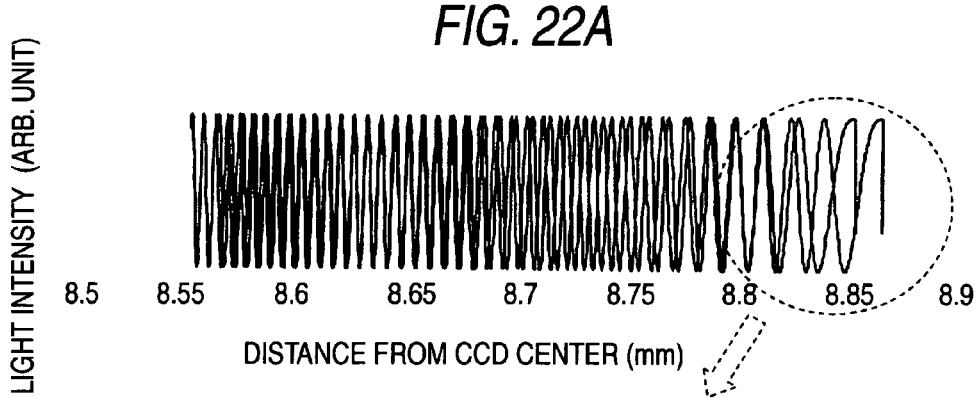
FIGS. 22A and 22B are views showing a result of simulation in the case where a hemisphere lens is used.
Figure 22B:
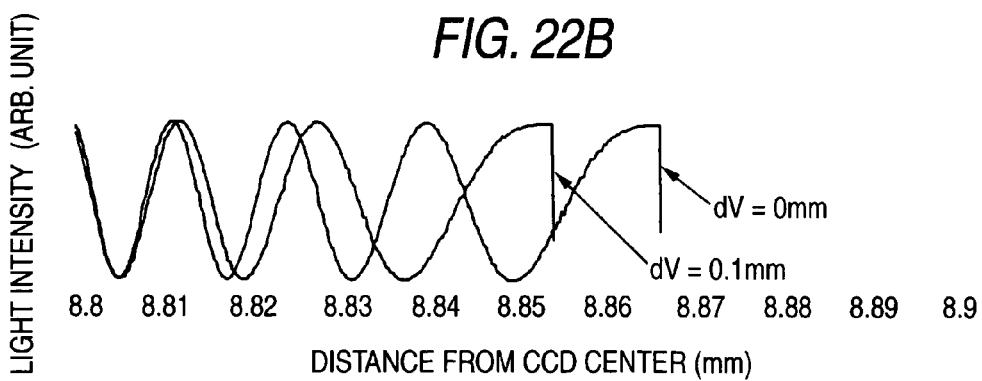

First, FIGS. 22A and 22B show a result of simulation of the change of the interference pattern formed on the CCD 3-12 in the case where the light source located at the point (150, 0) moves by 0.1 mm (dV=0.1 mm) in a direction perpendicular to the optical axis. Incidentally, attenuation of light intensity is neglected in this simulation but light intensity actually decreases as the location of light shifts from the outermost circumferential portion to the inside. FIG. 22A shows the interference pattern in a region of from the outermost circumference to the inside at a distance of 0.3 mm from the outermost circumference. FIG. 22B is an enlarged view showing the outermost circumference and its vicinity. The outermost circumference always has a peak value. It is obvious from FIG. 22B that the interference pattern moves by about 12 µm when the light source moves by dV=0.1 mm. Because this change can be detected sufficiently by a general CCD, the position of the light source 1-12 can be detected.

Figure 23A:
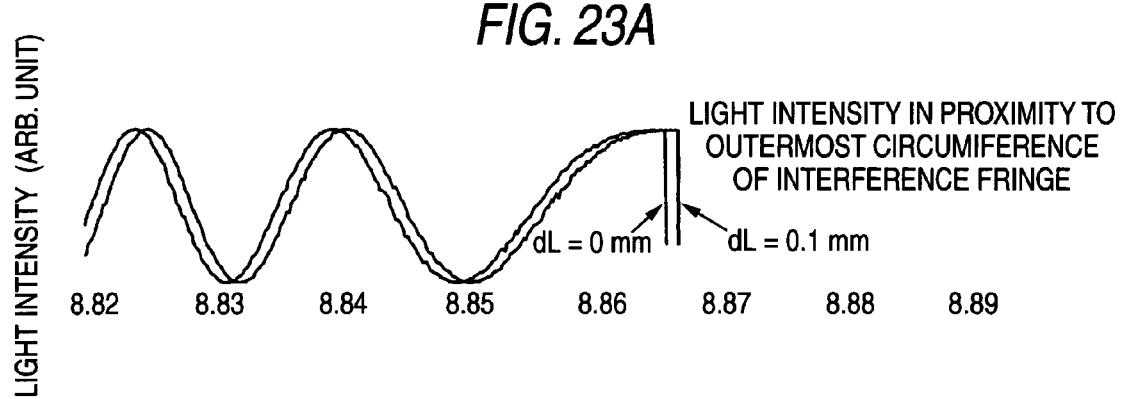
FIGS. 23A and 23B are views showing a result of simulation in the case where a hemisphere lens is used.
Figure 23B:
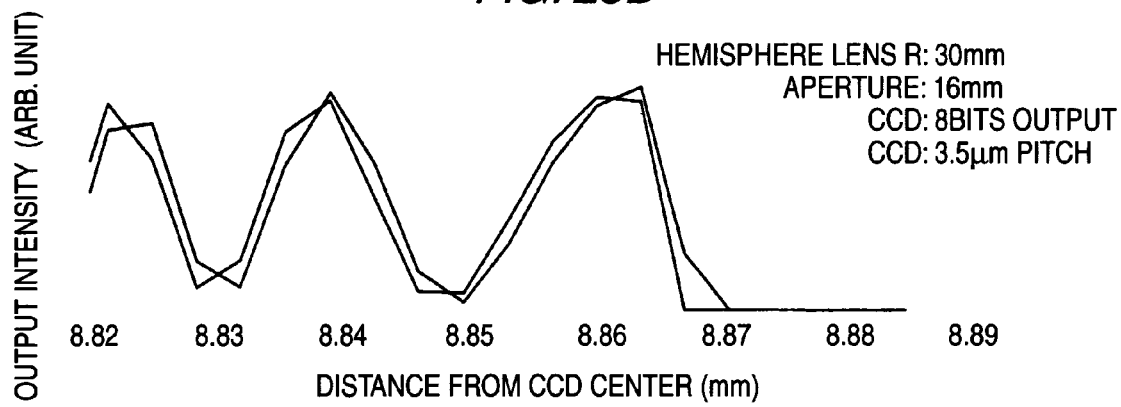

Next, FIGS. 23A and 23B show a result of simulation in the case where the light source moves by 0.1 mm (dL=0.1 mm) close to the lens in a direction parallel to the optical axis. FIG. 23A is a view showing the intensity of light in a region near the outermost circumference of the interference pattern. FIG. 23B is a view showing a result of simulation of a signal output in the case where the intensity of light is detected by the 3.5 µm-pitch CCD 3-12. The output signal has 8 bits (256 gradations). When the light source moves by 0.1 mm close to the lens in a direction parallel to the optical axis, the interference pattern is enlarged by about 1 µm. In this case, because the 8-bit output of the CCD changes by a value of from 10% to 20% as shown in FIG. 23B, the movement of the light source can be detected.

Figure 24:
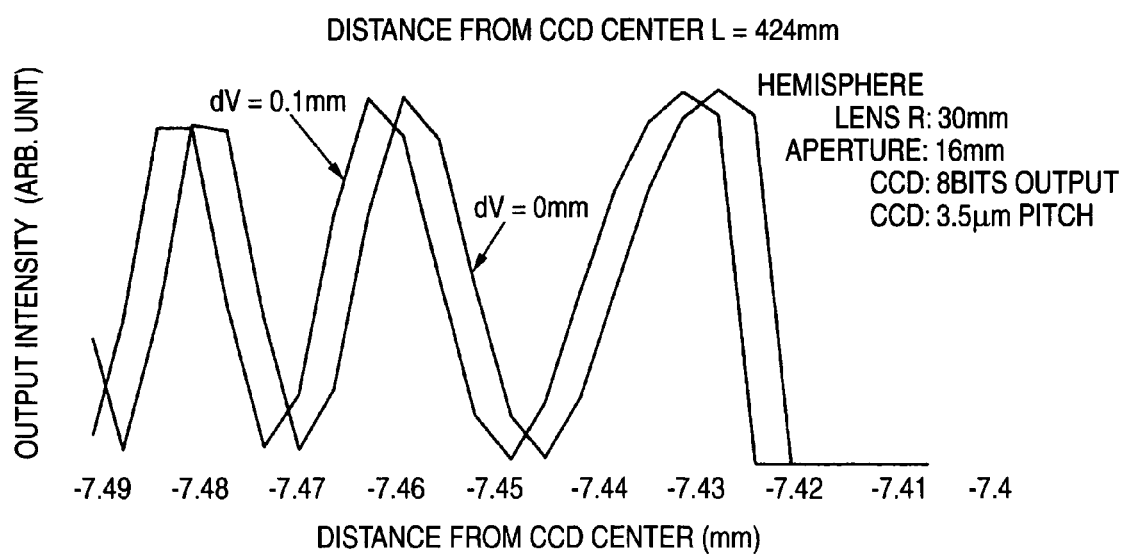
FIG. 24 is a view showing a result of simulation in the case where a hemisphere lens is used.

Further, FIG. 24 shows a result of simulation in the case where the light source is located at an angle of 45 degrees to the optical axis of the lens. When the light source is located at the point (300, 300), the distance between the light source and the origin is about 424 mm. FIG. 24 shows the change of the interference pattern formed on the CCD in the case where the light source moves by 0.1 mm in a direction perpendicular to a line connecting the light source and the origin, that is, moves by $dV=0.1$ mm$=(-0.1/\sqrt{2}, 0.1/\sqrt{2})$. As is obvious from FIG. 24, the interference pattern moves by about 3.4 µm. This moving distance is nearly equal to the pixel pitch of the CCD. Accordingly, this moving distance is a value that can be detected sufficiently by the photo acceptance element array, so that the movement of the light source can be detected. As described above, it has been found that the position of the light source can be detected according to the invention even in the case where the light source moves by a slight distance of 0.1 mm.

In this manner, it has been found that when a hemisphere lens is used, the position of the light source can be measured even in the case where the light source is located at a wide angle of 45 degrees to the lens as described in this embodiment.

In this embodiment, an aperture (not shown) is disposed as a stop in front of the first surface of the hemisphere lens 2-12. The aperture is effective in preventing an unnecessary interference pattern from being formed.

In this embodiment, a one-dimensional CCD having pixels arranged one-dimensionally is disposed in an x-y plane for measuring the two-dimensional position of the light source in the x-y plane. The one-dimensional CCD is effective in reading the pixel signal at a high speed.

When another one-dimensional CCD is further disposed in parallel to the z-axis direction, there is an effect that the three-dimensional coordinates (x, y, z) can be measured.

It is a matter of course that the three-dimensional position of the light source can be also measured when a two-dimensional CCD having pixels arranged two-dimensionally is used as the CCD. When the two-dimensional CCD is used, a long time is required for reading all pixel data. It is however unnecessary to provide all pixels for extraction of the interference pattern. The interference pattern can be extracted when data located only in mesh-like pixel positions are read. When this method is used, the number of data to be read is reduced so that the three-dimensional position can be measured at a high speed.

(Embodiment 13)

Figure 25A:
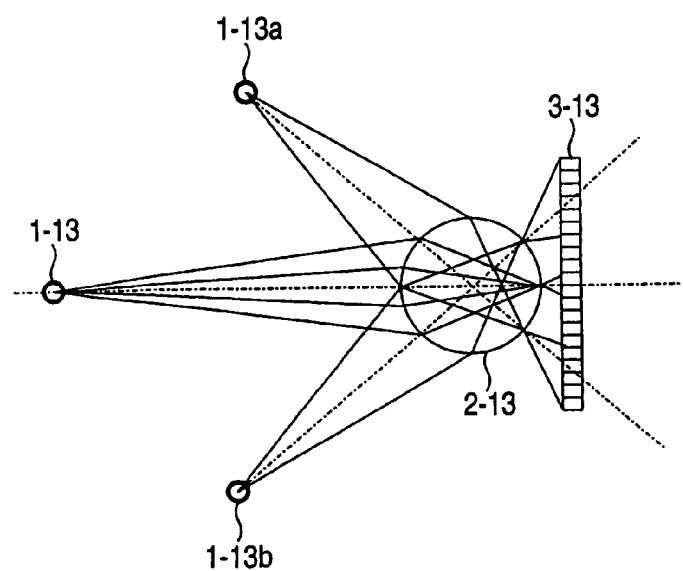
FIGS. 25A and 25B are typical views showing optical paths in the case where a sphere lens is used.
Figure 25B:
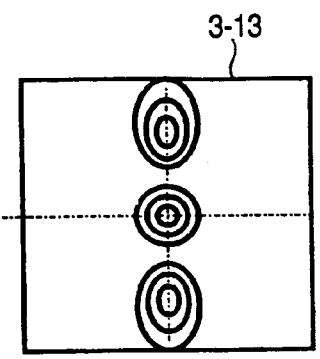
Figure 26:
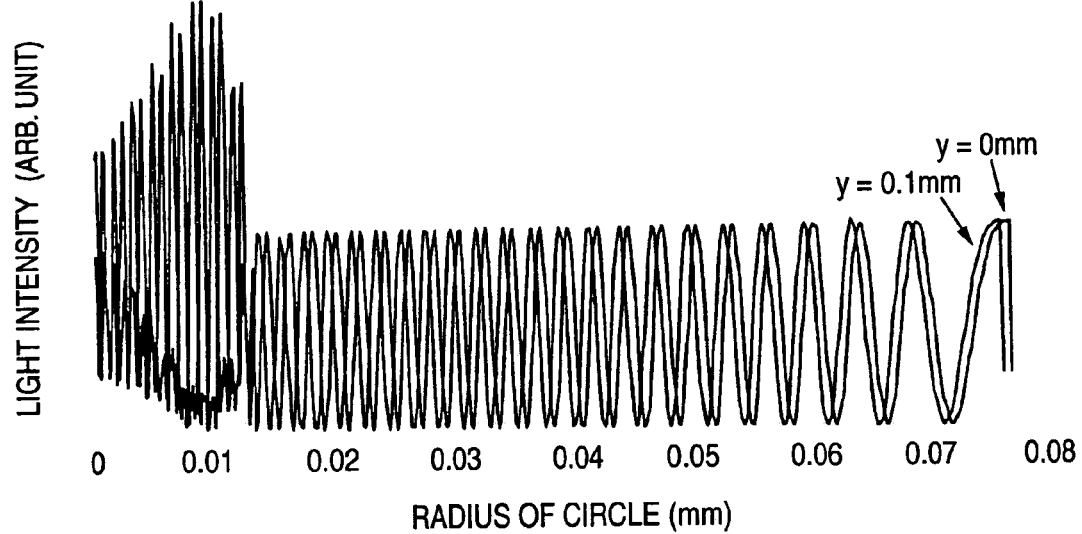
FIG. 26 is a view showing a result of simulation in the case where a sphere lens is used.

Embodiment 13 is provided for measuring the position of a light source by use of a sphere lens as an optical lens for forming interference of light on the basis of spherical aberration of the lens. FIGS. 25A and 25B are typical views showing the case where the interference pattern is formed on the basis of spherical aberration of a sphere lens. The characteristic of the sphere lens 2-13 is that light which is advancing toward the center of the sphere is not refracted but moved straightly though the light passes through the sphere lens. Accordingly, when the light source 1-13 is located on the optical axis of the lens, the interference pattern formed on the CCD photo acceptance element array 3-13 exhibits a complete shape of concentric circles. When the light source is out of the optical axis, the interference pattern exhibits a multiple ellipse shape different from the concentric circle shape because the CCD photo acceptance element array 3-13 is not perpendicular to a line connecting the light source 1–13a and the center of the sphere lens. In this case, a focus of each of ellipses forming the multiple ellipse shape is equivalent to a point of intersection between the CCD photo acceptance element array 3-13 and the line connecting the light source 1–13a and the center of the sphere lens. FIG. 26 shows a result of simulation for measuring the displacement of the light source by use of the sphere lens. Incidentally, attenuation of light intensity is neglected in this simulation but light intensity actually decreases as the location of light shifts from the outermost circumferential portion to the inside. The light source was located on the optical axis and at a distance of 300 mm from the lens. The CCD photo acceptance element array was disposed in a position at a distance of 0.7 mm from the second surface of the lens. The diameter of the sphere lens was 3 mm. An aperture with a diameter of Φ2.1 mm for limiting incident light was stuck closely to the first surface of the lens. The refractive index of the lens was 1.4. The wavelength of the light source was 780 nm. FIG. 26 shows a state in which the interference pattern moves by about 0.4 µm when the light source is moved by 0.1 mm (y=0.1 mm) in a direction perpendicular to the optical axis. If the movement of the interference pattern is read by the CCD photo acceptance element array, the position of the light source can be measured.

(Embodiment 14)

Figure 27A:
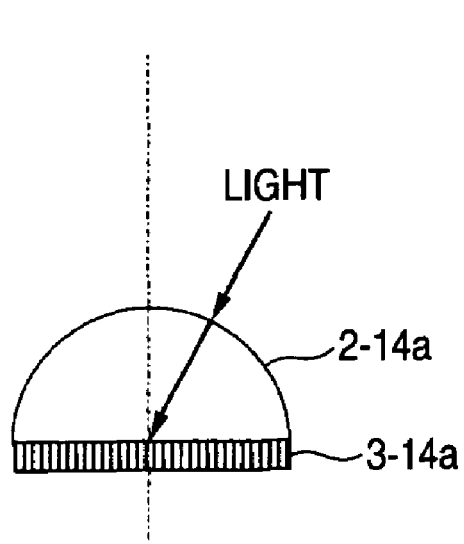
FIGS. 27A and 27B are views showing examples of a lens using spherical aberration.

Although Embodiment 12 has been described upon the case where the hemisphere lens has a first surface formed as a flat surface to which light is input, and a second surface formed as a spherical surface, the invention may be also applied to the case where the hemisphere lens has a first surface formed as a spherical surface, and a second surface formed as a flat surface as shown in FIG. 27A. In this case, the CCD photo acceptance element array 3-14 may be stuck closely to the second surface of the hemisphere lens so that the hemisphere lens can be used as a wide-angle lens. When the second surface of the hemisphere lens is stuck closely to the CCD photo acceptance element array 3-14 to thereby design the lens so that light refracted by the first surface of the hemisphere lens forms an interference pattern on the second surface of the hemisphere lens, the interference pattern can be directly detected by the CCD photo acceptance element array 3-14.

Figure 27B:
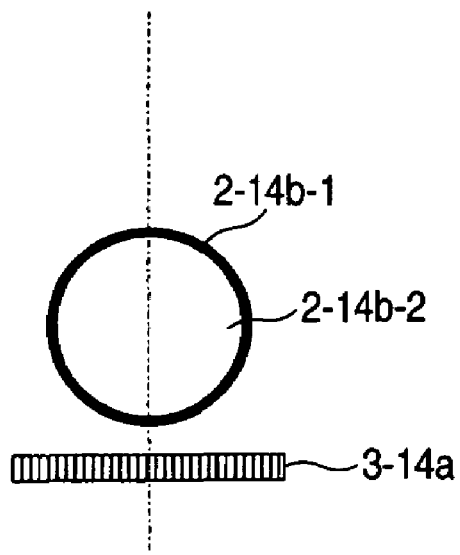

On the other hand, as shown in FIG. 27B, the sphere lens may be composed of a material 2-14b-1 for forming a spherical surface as the outer surface of the sphere lens, and a material 2-14b-2 with which the inside of the sphere lens is filled. In this case, the refractive index of the lens can be changed easily. Particularly when the inside of the sphere lens is filled with a low-refractive-index material such as refractive fluid, the refractive index of the lens can be set at a small value of 1.2. Accordingly, the degree of freedom for designing the lens forming interference can be enlarged so that lenses satisfying various kinds of purposes can be designed.

Furthermore, in the same manner, while the outer shape of the first surface of the hemisphere lens 2–14a is made of thin spherical glass, a space between the thin spherical glass and the CCD photo acceptance element array 3–14a may be filled with refractive fluid or the like to thereby form an optical lens. Also in this case, the refractive index of the lens can be selected from a variety of options, which is effective in enlarging the degree of freedom for designing the lens.

As described above, in this embodiment, a variety of forms and materials can be used as lens systems each of which can form a pattern of interference of light on the basis of spherical aberration of the lens. There is an effect that the lens can be used widely in accordance with the purpose.

(Embodiment 15)

Figure 28:
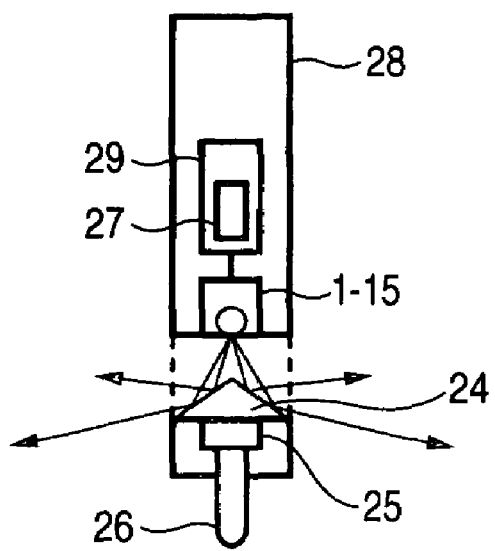
FIG. 28 is a typical view showing an example of configuration of a light-emitting pen.

This embodiment is relevant to Embodiment 6. This embodiment relates to a light-emitting pen mounted with a semiconductor laser light source in proximity to a pen point and used as a pen input to a computer. FIG. 28 is a view typically showing the light-emitting pen 28. A conical mirror 24 is disposed just under a semiconductor laser 1-15. As the structure, the circumference of the conical mirror 24 is made of a transparent material capable of transmitting the laser beam. A pen point 26 of a ball point pen is attached to a front end of the light-emitting pen 28 so that a character can be actually written with the pen point 26. Writing pressure applied on the pen point 26 is detected by a pressure sensor 25. When a character is actually written on a sheet of paper with the ball point pen, a control portion 29 receives the writing pressure detected by the pressure sensor 25 and supplies a current value corresponding to the writing pressure from an internal battery 27 to the semiconductor laser 1-15 so that a laser beam can be emitted from the semiconductor laser 1-15. Accordingly, only when a character is written on a sheet of paper, the semiconductor laser 1-15 which is a light source emits a laser beam so that the position of the light source can be measured by a method described in Embodiment 6, Embodiment 12 or the like. Furthermore, the quantity of light emitted from the light source 1-15 can be found on the basis of the relation between the three-dimensional position of the light source and the intensity of light accepted by the CCD photo acceptance element array, so that the writing pressure can be detected. Accordingly, the position of the pen and information of the writing pressure can be input to the computer simultaneously, so that a character written strongly or a character written weakly can be displayed on the computer while reflected on the thickness, color, etc. of the line.

Although this embodiment has been described upon the case where the coordinates of the pen point are calculated on the basis of the laser beam which is emitted from the semiconductor laser only when a character is actually written on a sheet of paper, the invention may be also applied to the case where the semiconductor is set so that the semiconductor laser emits a laser beam with low intensity when no character is written but the semiconductor laser emits a laser beam with high intensity when a character is written. In this case, when the intensity of the laser beam emitted from the semiconductor laser is higher than a certain threshold, a decision can be made that a character is written.

Alternatively, the semiconductor laser may emit a laser beam continuously so that a character written on a certain plane can be extracted. When, for example, a character is written on a certain plane, the 3D coordinates of the locus of the character among the time-series 3D coordinates of the pen point exist in the certain plane. Accordingly, if an equation of the plane on which the character is first written is extracted and continuous coordinates existing on the plane are then extracted, only 3D coordinates corresponding to the character can be extracted. Character entry can be also executed by the aforementioned method.

Although the laser pointer has been already described in Embodiment 9, the laser pointer and other applied examples thereof will be described below in more detail.

Use of a computer screen projected onto a screen has increased in recent lecture meetings or the like. A pointer capable of serving as a computer input such as a mouse as well as capable of indicating an actually existing point in the same manner as the conventional laser pointer has been required. As a technique proposed at present, there is a technique in which a point indicated by the laser pointer is detected by a CCD camera attached to a projector so that a cursor can be moved to the coordinates of the point. This technique can be applied only to a projection type display. It is however impossible to apply this technique to a general display. There is a problem that this technique cannot be used for general purposes. As another technique, there is a gyro pointer. This is a technique using a gyro which is an angle sensor for measuring the three-dimensional rotational moving distance of the gyro pointer and transmitting the moving distance to a computer by radio to thereby move a cursor. In this technique, only the rotational moving distance of the gyro pointer is measured but the direction of a vector actually designated by a person using the gyro pointer has totally no relation to the cursor position. There is a problem that the pointed position is unintelligible. As a further technique, there has been proposed a technique using light or ultrasonic wave for measuring the three-dimensional position of a pointer as an input unit to a computer. In this technique, the direction of a vector pointed by the pointer is unknown so that the function of "indicating a point on a line extended from a finger or hand" naturally expressed by a person cannot be achieved. This causes a problem that the direction of the vector is unintelligible to the other persons. As a technique using three-dimensional position measurement for making the direction of the vector pointed by the pointer intelligible, there is a technique in which two or more light-emitting points are mounted for performing measurement. In this technique, there is however a problem that both system configuration and measurement become complex.

In addition thereto, three-dimensional image acquiring methods as further methods used in the three-dimensional image acquiring technique are roughly classified into active type techniques and passive type techniques. An optical cutting method is typical one of the active type techniques. The optical cutting method is a method in which images of an object scanned with a slit beam are successively picked up by a camera to thereby acquire a distance image on the basis of the theory of triangulation. In this method, however, an image of the object must be picked up by the camera whenever the position of the slit beam is changed. There is a disadvantage that a long time is required for completing the scanning due to the slit beam. Furthermore, because a polygon mirror or the like is used for the scanning due to the slit beam, there is also a disadvantage that consumed electric power is too large to obtain portability. As a method for improving the disadvantage that a long time is required, there has been proposed a spatial coding method in which a pattern beam having variation in luminance is projected onto an object to specify the sequence of patterns on the basis of luminance information of the pattern beam to thereby perform triangulation. In this method, there is however a disadvantage that variation in luminance based on the reflectance of the object may cause error because luminance is changed to a plurality of values. Furthermore, when the object is deep, there is also a disadvantage that error is apt to be induced because the projected pattern beam is out of focus. In addition, there is a disadvantage that cost increases because of the complex structure.

As typical one of the passive type techniques, there is a method in which characteristic points of an object are verified by stereo view using two cameras to thereby acquire a three-dimensional image on the basis of the theory of triangulation. In this method, because the object is grasped by the two cameras at different angles, the two cameras differ in luminance information used for extracting the characteristic points. There is a disadvantage that verification is apt to be mistaken. In addition, there is a disadvantage that cost increases because the number of cameras used is two.

As described above, with respect to the pointer capable of inputting data to a computer, there is a problem that the direction of a vector pointed is unknown, the system configuration is complex and large-scaled, or the pointer can be used only for a specific kind of display unit. With respect to the three-dimensional image acquiring technique, there is a problem that a long time is required, consumed electric power is large, variation in luminance information is apt to cause error in verification of characteristic points, or the projected pattern is out of focus in accordance with the distance to the object. As will be described later, in accordance with the invention a laser pointer or a three-dimensional image acquiring system can be produced in simple structure and at low cost by using the aforementioned interference of light.

Figure 29:
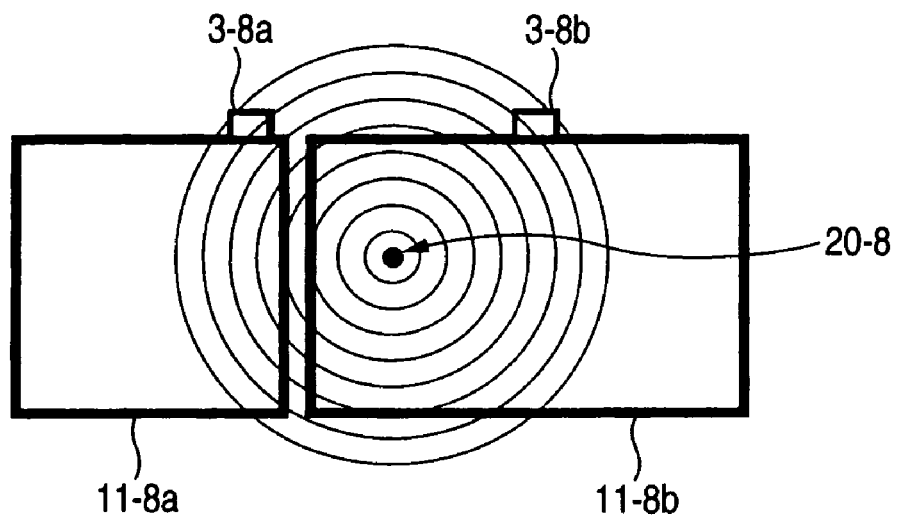
FIG. 29 is a view showing an interference pattern projected onto a display.

First, the laser pointer according to the invention will be described. FIG. 29 shows a state in which an interference pattern shaped like concentric circles on the basis of the basic theory of the invention is projected onto an object such as a display 11–8a or 11–8b. The interference pattern shaped like concentric circles is formed by lines of intersection between a plurality of cones (cones expressing the spatial region of peaks of light intensity in line) with the optical lens forming the interference pattern as their apexes and a plane onto which the interference pattern is projected. Because a line of intersection between a cone and the plane always forms an ellipse, the interference pattern projected onto a plane forms a multiple ellipse structure. When the plane is perpendicular to the optical axis of the light source, the projected interference pattern is shaped like concentric circles. In a coordinate system with the major axis of each ellipse as an X axis and the minor axis thereof as a Y axis, each ellipse can be expressed by the following formula (5).

$$\frac{X^2}{a^2} + \frac{Y^2}{b^2} = 1 \tag{5}$$

This coordinate system based on the ellipse is transformed into a stationary coordinate system x-y on the plane of projection. Because the two coordinate systems are on a plane, the two coordinate systems can be associated with each other by coordinate transformation of parallel movement of (p, q) and rotation of θ.

$$x = x \cos\theta + y \sin\theta - p$$

$$y = -x \sin\theta + y \cos\theta - q \tag{6}$$

When the relational expressions (6) are put into the formula (5), the following formula is given.

$$\frac{(x\cos\theta + y\sin\theta - p)^2}{a^2} + \frac{(-x\sin\theta + y\cos\theta - q)^2}{b^2} = 1 \tag{7}$$

CCD sensors 3–8a and 3–8b are disposed on the plane onto which the pattern of interference of light is projected. The coordinates (x, y) of five points on a certain concentric circle are read and put into the formula (7). Because five variables a, b, p, q and θ are unknown, the unknown variables can be decided when the coordinates of five points are read. Because a plurality of concentric circles are projected onto each CCD sensor, a point of convergence of a plurality of ellipses can be calculated when equations of different ellipses are deduced. The point of convergence is a point 20-8 of intersection between the optical axis of the light source and the plane of projection. When this system is used as a laser pointer, the point 20-8 is a point indicated by the laser pointer.

Figure 30:
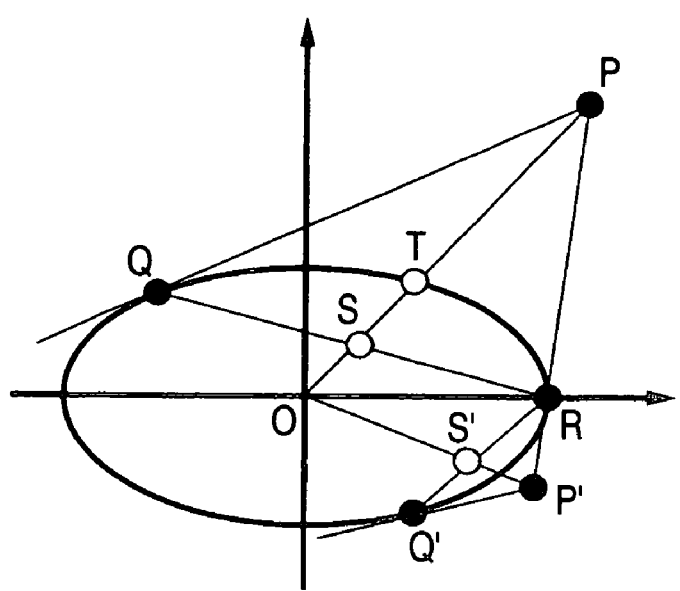
FIG. 30 is a view for explaining a method for obtaining the center point of multiple ellipses geometrically.

The operation of calculating the unknown variables by putting the coordinates of five points on an ellipse into the formula (7) is too troublesome to be adapted to real-time processing of an image grasped by each CCD sensor. A method for finding the point of convergence of the plurality of ellipses by a simpler means is required. FIG. 30 is a view showing a method for calculating the center point of an ellipse easily. Assume now that O is the center point of the ellipse and P is a point of intersection between lines tangential to the ellipse at points Q and R on the ellipse. When S is a point of intersection between a line segment OP and a line segment QR and T is a point of intersection between the line segment OP and the elliptic curve, the following relational expressions (8) and (9) hold. (The expressions (8) and (9) can be deduced easily when an auxiliary circle is considered).

$$QS = SR \tag{8}$$

$$OS \cdot OP = OT^2 \tag{9}$$

When OP=OS+SP and OT=OS+ST are put into the expression (9), the following expression (10) can be given.

$$OS = ST^2/(SP - 2 \cdot ST) \tag{10}$$

If the length of the line segment OS is found, the center point O can be calculated on the basis of an equation of the line PS. The aforementioned procedure can be rearranged as follows.

(1) One elliptic curve is extracted and lines tangential to the ellipse at two points Q and R on the ellipse are calculated.

(2) A point P of intersection between the tangential lines, a midpoint S of the line segment QR and a point T of intersection between the line PS and the elliptic curve are calculated.

(3) The length of the line segment OS is found on the basis of the expression (10), so that the center point O of the ellipse can be calculated.

Although here is shown the case where lines tangential to an ellipse at two points on the ellipse are calculated to thereby calculate the center of the ellipse, the center of the ellipse can be also calculated on the basis of calculation of lines tangential to the ellipse at three points on the ellipse as follows.

(1) One elliptic curve is extracted and lines tangential to the ellipse at three points Q, R and Q' on the ellipse are calculated.

(2) Points P and P' of intersection between the tangential lines and midpoints S and S' of the line segments QR and RQ' are calculated.

(3) Lines PS and P'S' are obtained, so that the center point O of the ellipse which is a point of intersection between the lines PS and P'S' can be calculated.

Although two methods for calculating the center of the ellipse have been described, either method may be used.

When each ellipse is low in oblateness or when accuracy is not required, the center point of an ellipse can be regarded as the point of convergence of the multiple ellipse structure. When high accuracy is required, the point of convergence of the multiple ellipse structure can be deduced as follows. The center points of three or more ellipses are calculated, so that the point of convergence is calculated on the basis of the rate of change of the coordinates of the center point. Alternatively, the center point (p, q) of an ellipse and three points on the ellipse are put into the formula (7) to thereby calculate the unknown variables a, b and θ. Then, the inclination of the plane to the optical axis is calculated on the basis of the oblateness b/a of the ellipse, so that the point of convergence is calculated.

Generally, the plane of projection is a display or projection screen surface. Generally, the plane is often disposed so as to be perpendicular to a floor. When the light source is far from the plane, the optical axis of the light source is often nearly perpendicular to the plane of projection. In this case, each ellipse can be regarded as a circle and the formula (7) can be simplified as follows.

$$(x-p)^2+(y-q)^2=r^2 \quad (11)$$

Figure 31:
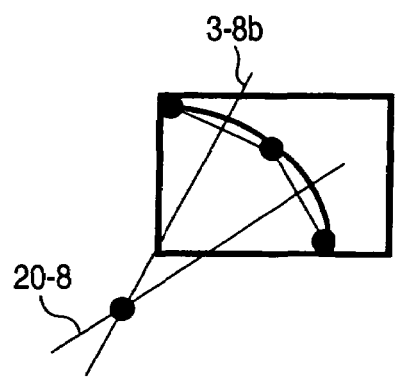
FIG. 31 is a view for explaining a method for obtaining the center of a circle geometrically.

Because three variables p, q and r are unknown, a solution can be obtained when three points on the circle are read by the CCD sensor. Alternatively, as shown in FIG. 31, the center 20-8 of the circle may be calculated geometrically on the basis of the relation that when any three points on a circular arc in the CCD sensor 3–8b are selected, a point of intersection between two lines obtained by perpendicularly bisecting two line segments each connecting two of the three points is equal to the center point of the circle. In the case of concentric circles, there is a merit that the center point of the concentric circles can be calculated easily because the point of convergence of the multiple ellipse structure required in the case of ellipses need not be found.

Figure 32:
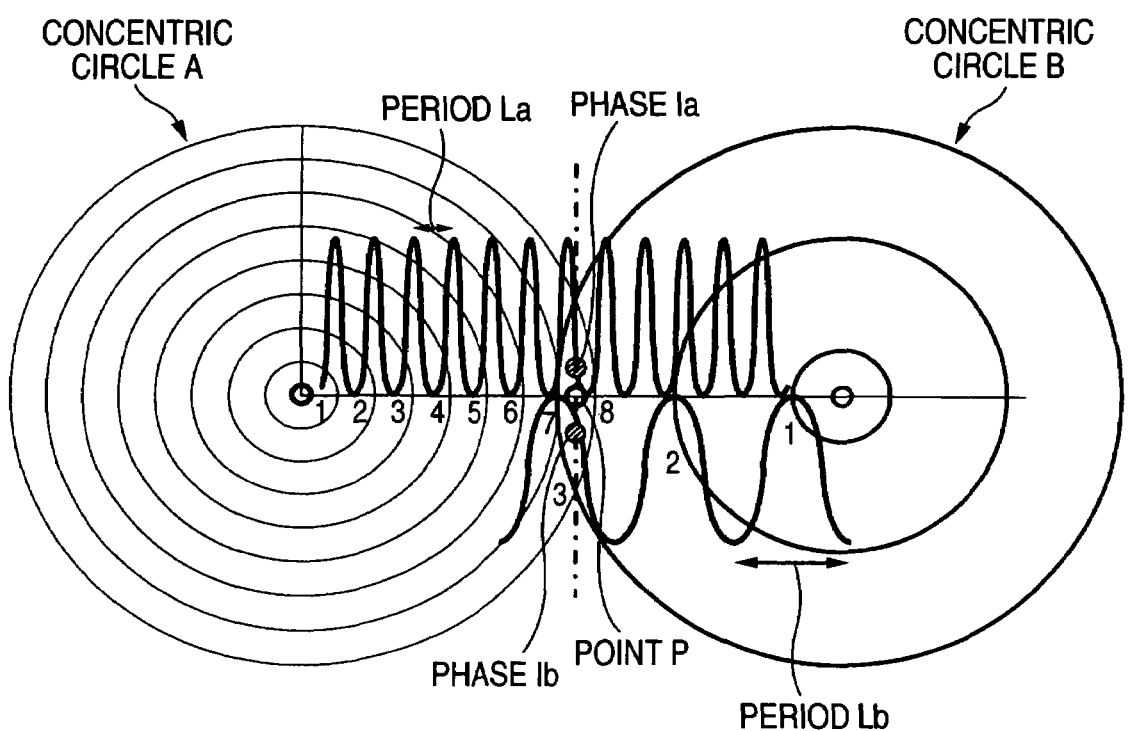
FIG. 32 is a typical view showing a method for obtaining a position on the basis of the phase information of concentric circles.

Next, the three-dimensional image acquiring technique according to the invention will be described. An optical lens for forming an interference pattern shaped like concentric circles is disposed in front of a laser light source. The interference pattern shaped like concentric circles is projected onto an object. An image of the interference pattern projected on the object is picked up by a camera. Because the intensity of light of the interference pattern changes periodically in the form of a cosine curve from the center point of the concentric circles, the phase information of each pixel can be obtained if at least a half period of the cosine curve can be taken in a certain image region. If the unevenness of the object is so severe that the cosine curve of the camera image is little by little interrupted to make the period of the interference pattern indistinct, a reference beam having uniform light intensity equal to the peak value of light intensity of the interference pattern may be projected so that the phase can be calculated on the basis of the light intensity of the interference pattern of a target pixel. When, for example, the light intensity of the interference pattern of a certain pixel is equal to a half of the light intensity of the reference beam, the phase is π/2 or 3π/2. (A point with the phase of 0 or 2π has light intensity of 1 whereas a point with the phase of π has light intensity of 0). When a judgment is made as to whether the light intensity of an adjacent pixel is lower or higher than the light intensity of the pixel, a decision can be made as to whether the phase is π/2 or 3π/2. In this manner, when the reference beam is used, there is a merit that the phase information can be found easily even in the case where the object has a severely uneven shape having fine regions. Assume now that Ia is the phase of concentric circles A at a target point P and Ib is the phase of concentric circles B at the target point P. FIG. 32 is a view typically showing this relation. The period of the concentric circles A is La. The period of the concentric circles B is Lb.

Figure 33:
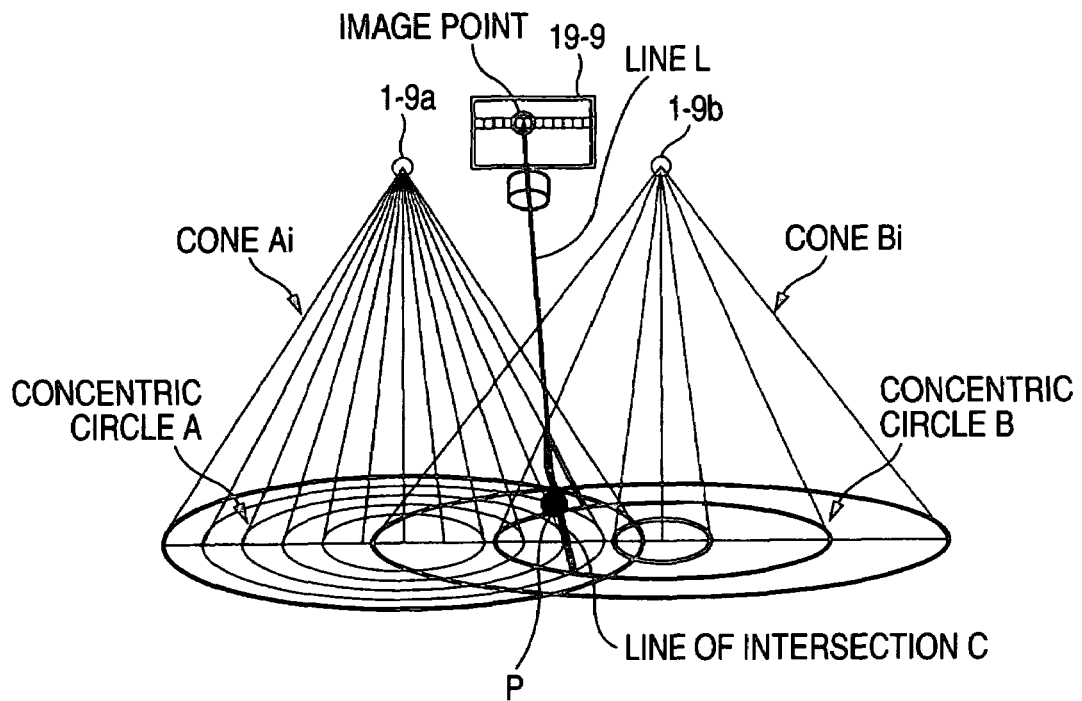
FIG. 33 is a schematic view showing a method for obtaining a position on the basis of the phase information of concentric circles.

When the phases Ia and Ib are decided, the coordinates satisfying the phases Ia and Ib form lines of intersection of multiple cones formed by the phase Ia of the concentric circles A and the phase Ib of the concentric circles B as shown in FIG. 33. In FIG. 33, the reference numerals 1–9a and 1–9b designate light sources; and 19-9, a CCD sensor (image point). Although a plurality of lines are generally provided as the lines of intersection of the multiple cones, the positions of the lines of intersection of the multiple cones can be decided on the basis of a line L passing through the point of a CCD pixel for the target point P and the target point P decided on the basis of the principal point of the lens. That is, a point of intersection between the line L and each line of intersection forms the three-dimensional coordinates of the target point P. In other words, a point which is included in points of intersection between the line L and the multiple cones with the phase Ia and which is included in points of intersection between the line L and the multiple cones with the phase Ib can be regarded as the three-dimensional coordinates of the target point P to be obtained. When there are unexpectedly a plurality of solutions, a solution can be specified if another light source C is used for forming concentric circles C to thereby measure the phase of the target point P.

In this three-dimensional image acquiring technique, extraction of the characteristic points of the object, verification (pattern matching) thereof, etc. are not required. Furthermore, because a semiconductor laser can be used as each laser light source, consumed electric power is low. In addition, because the size of the laser light source is Φ5.6 mm or Φ3.3 mm in diameter while the size of the optical lens is substantially equal to the size of the laser light source, reduction in size can be achieved.

Embodiments of the laser pointer and the three-dimensional image acquiring technique will be described below.

(Embodiment 16)

Figure 34A:
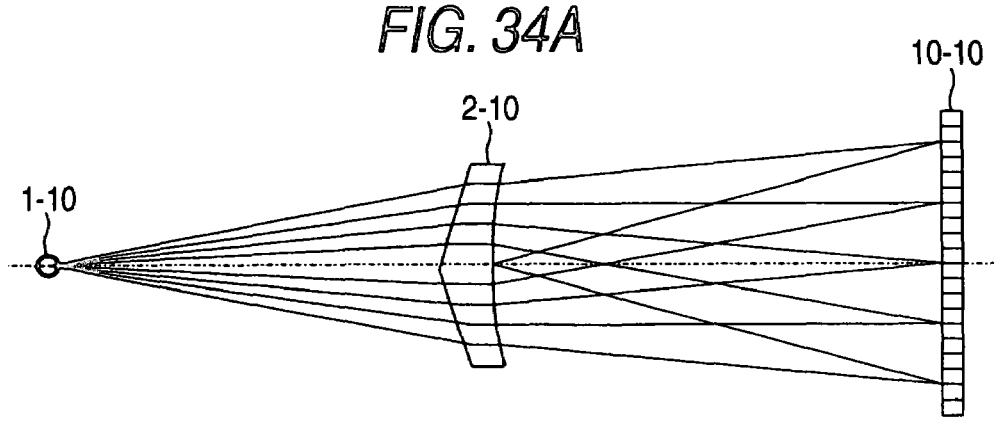
FIGS. 34A and 34B are views showing an optical system for projecting an interference pattern shaped like concentric circles.

In Embodiment 16, a conical/concave lens is used for projecting an interference pattern shaped like concentric circles onto a target plane as shown in FIG. 34A. As shown in FIG. 34A, light emitted from a laser light source 1-10 is projected onto a computer display or CCD photo acceptance element array 10-10 through an optical lens 2-10.

Figure 34B:
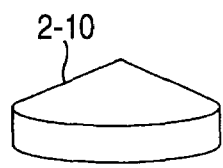
Figure 35A:
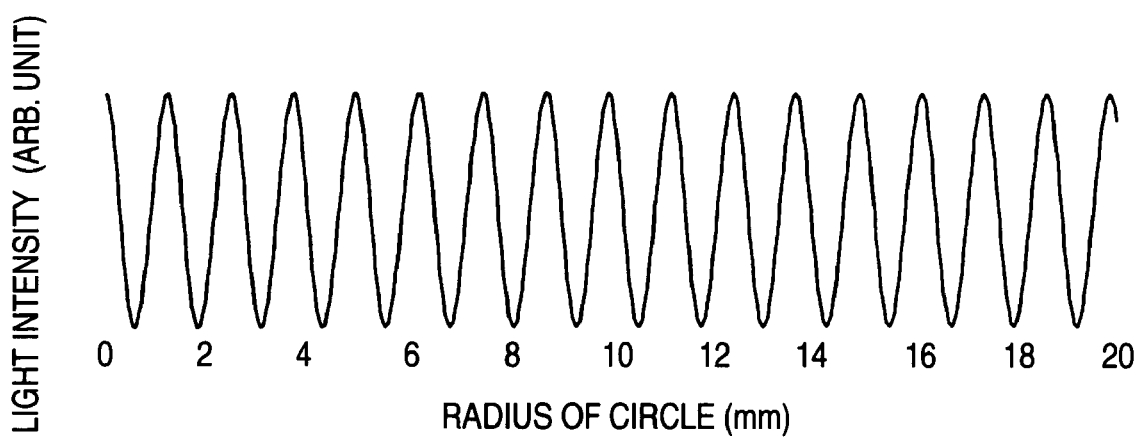
FIGS. 35A and 35B are views showing a result of simulation of an interference pattern shaped like concentric circles.
Figure 35B:
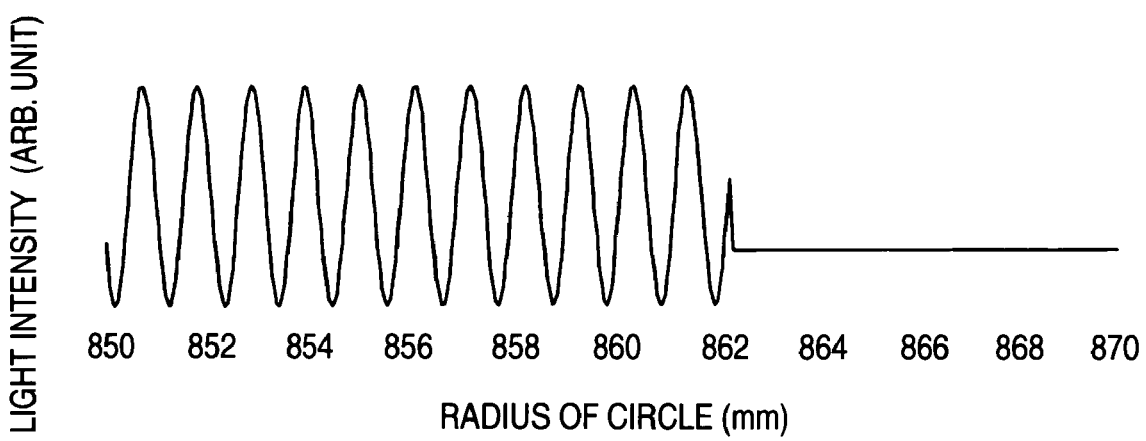

The optical lens 2-10 as shown in FIG. 34B is used as a unit for projecting the interference pattern. The optical lens 2-10 has a front surface formed as a conical surface, and a rear surface formed as a concave surface. The concave surface as the rear surface of the lens is effective in widely enlarging the interference pattern shaped like concentric circles. The specification of the optical lens is as follows. The outer diameter of the conical lens region (front surface) is Φ6 mm. The height of the conical shape is 1.4 mm. The curvature radius of the concave lens region (rear surface) is −20 mm. The thickness of the lens is 1.3 mm on the optical axis. The refractive index of the lens is 1.6. The distance between the laser light source 1-10 and the front surface of the lens is set at 3 mm. The wavelength of the laser light source is 780 nm. It has been found from a result of simulation that an interference pattern shaped like concentric circles shown in FIGS. 35A and 35B is formed on the plane of projection when the plane (CCD photo acceptance element array) of projection is disposed at a distance of 3000 mm from the rear surface of the lens. In FIG. 35A, the point "0" on the horizontal axis shows the center of the concentric circles. As is obvious from FIGS. 35A and 35B, a large number of concentric circles are formed up to a concentric circle with a radius of 860 mm or more.

The interference pattern is projected onto a computer display. The concentric circles of the interference pattern are detected by the CCD photo acceptance element array mounted in a frame of the display. If the center of the concentric circles is calculated by an arithmetic unit and a cursor is moved to the calculated position, a light source module having the laser light source and the optical lens integrated with the laser light source can be used as a spatial mouse, that is, a pointer. The calculation of the center of the concentric circles can be performed as follows. Any three points are extracted from one circular arc. Two line segments each connecting two of the three points are formed. A point of intersection between lines obtained by perpendicularly bisecting the two line segments respectively is calculated as the center of the concentric circles.

As described above, an interference pattern shaped like concentric circles can be formed by a simple method of combining a conical lens with a semiconductor laser light source. A system capable of inputting a position indicated by a pointer into a computer can be formed in a simple configuration that a part of the interference pattern shaped like concentric circles is detected by a CCD provided near a display.

Although this embodiment has been described upon the case where a computer display surface is used as the plane of projection of the interference pattern, it is a matter of course that a rectangular display region projected onto a white wall or the like by a projection display device or the like is used as the plane of projection of the interference pattern.

In this embodiment, the CCD photo acceptance element array is mounted in a frame of the display and a cursor is moved to the center point of the concentric circles of the interference pattern. To perform this operation, it is necessary to grasp the positional relation between the display region of the display and the CCD accurately in advance. For example, as the method, there is carried out an operation of (1) pointing three points of corners of the rectangular display region and inputting the coordinates of the three points.

Incidentally, if three CCD photo acceptance element arrays are prepared and disposed on the three corners of the display region of the display, the labor for carrying out the operation (1) can be omitted effectively.

(Embodiment 17)

Embodiment 17 is provided for measuring the optical axis and 3D position of a laser light source on the basis of interference fringes projected at regular intervals onto a plane.

Figure 36A:
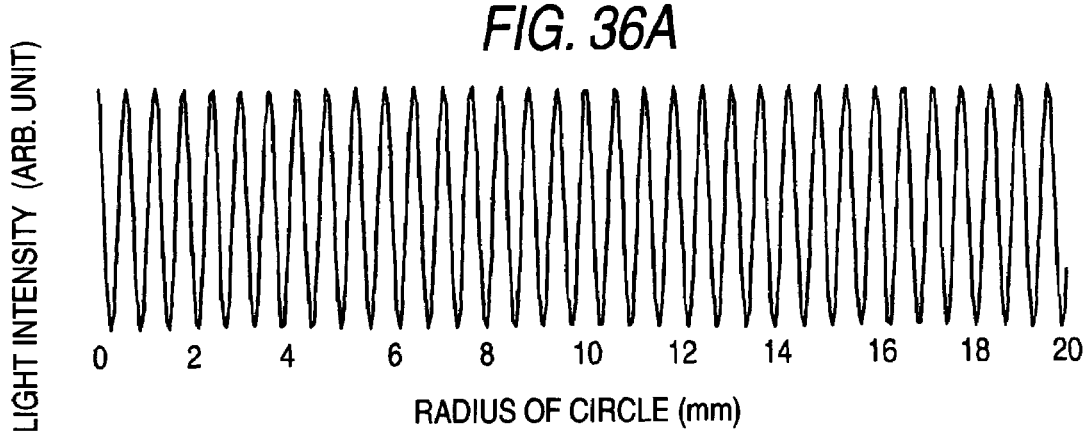
FIGS. 36A and 36B are views showing a result of simulation of an interference pattern shaped like concentric circles arranged at regular intervals of a pitch.
Figure 36B:
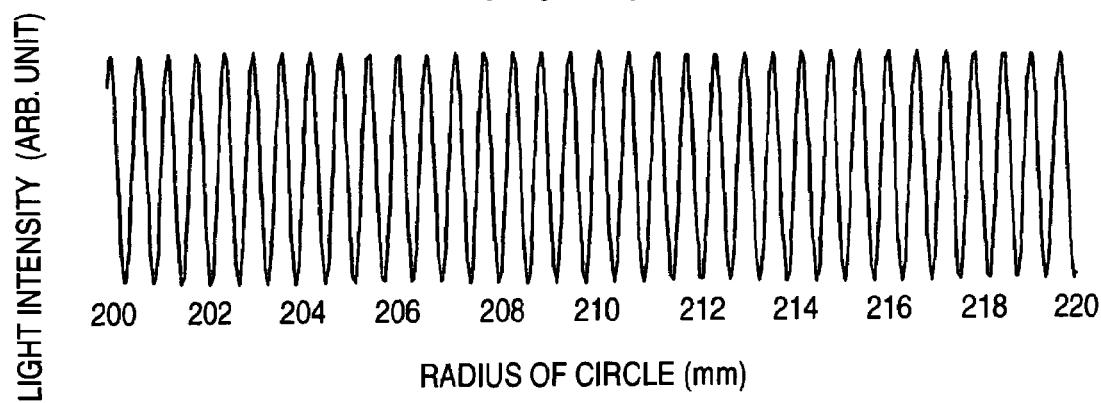

A lens having a front surface formed as a conical surface, and a rear surface formed as a concave surface is used as the optical lens. The specification of the lens is as follows. The diameter of the lens is Φ6 mm. The height of the conical shape is 1.4 mm. The thickness between the apex of the cone and the center of the concave surface is 2 mm. The curvature radius of the concave surface is 8 mm. The refractive index of the lens is 1.6. The distance between the laser light source (wavelength: 780 nm) and the apex of the cone is set at 2.5 mm. FIGS. 36A and 36B are views showing an interference pattern shaped like concentric circles formed on the plane of projection in the case where the distance from the center of the concave surface of the lens to the plane of projection is 1 m. It is obvious from comparison between FIGS. 36A and 36B that the pitch in FIG. 36A is quite equal to the pitch in FIG. 36B. That is, it has been found that the pitch of the interference pattern is uniform in any place of the plane if the plane is perpendicular to the optical axis of the light source.

Although it may be conceived that a portion of the interference pattern radially far from the center of the concentric circles has a large interference pitch because the distance from the laser light source is long, the interference pitch generally often has a tendency to decrease slightly because the angle between the optical path of light and the optical axis increases so that the phase difference of interference occurs easily. It has been however found that these can be canceled out by each other to make the interference pitch always constant when the rear surface of the lens is selected to have a certain curvature radius as described above.

When the interference pattern is shaped like concentric circles, that is, when the plane is perpendicular to the optical axis of the light source, the distance between the plane of projection and the light source can be found directly on the basis of the pitch of the interference pattern grasped by the CCD. Because the light source is located on a perpendicular line erected at the center point of the concentric circles, the 3D coordinates of the light source can be calculated simply on the basis of the distance from the plane to the light source.

When the interference pattern is shaped like multiple ellipses, that is, when the plane is not perpendicular to the optical axis of the light source, an equation of each ellipse and a point of convergence of the multiple ellipses are calculated by the aforementioned method. The oblateness of the ellipse can be deduced from the equation of the ellipse, so that the angle between the optical axis and the plane of projection can be calculated. The distance to the light source can be calculated on the basis of the angle and the pitch of the interference pattern, so that the three-dimensional position of the light source on the optical axis can be calculated.

Because the 3D position of the light source and the direction of the optical axis can be calculated in this manner, this technique can be applied to a position measuring system, a goniometer, etc. as well as to the laser pointer. Further, if the light source is disposed so that the optical axis of the light source faces the front of a human face, this system can be used as a system for detecting the position and direction of the human face.

(Embodiment 18)

In Embodiment 18, the three-dimensional position of a light source is calculated as follows. The direction of the optical axis of the light source is obtained. Further, an image of the laser light source is picked up by a general CCD camera to thereby calculate "a line passing through the light source and the principal point of the camera" on the basis of the pixel position of the light source and the principal point of the camera. A point of intersection between the direction of the optical axis and the line is calculated as the three-dimensional position of the light source.

Figure 37:
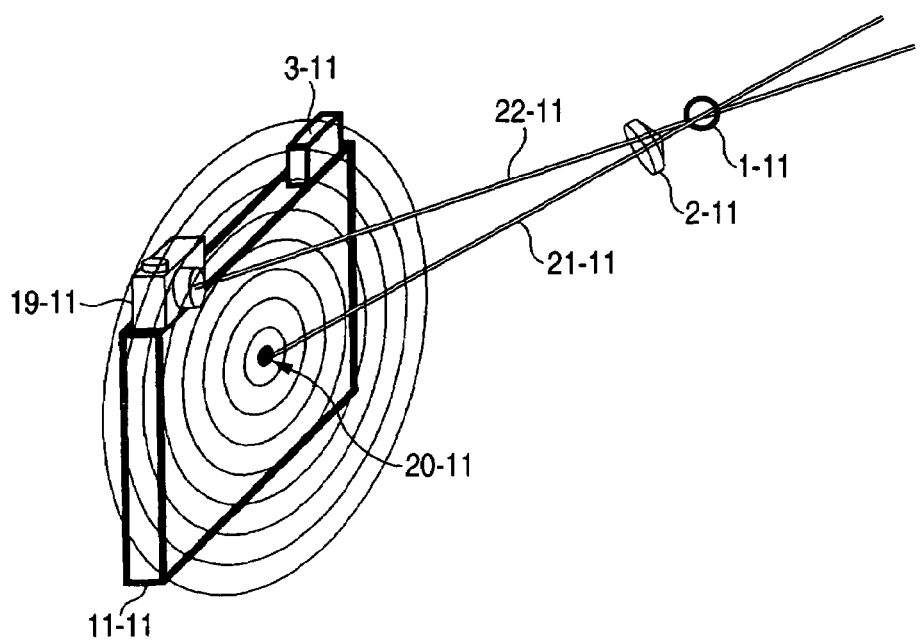
FIG. 37 is a view for explaining a method for calculating the three-dimensional position of a light source.

As shown in FIG. 37, an optical lens 2-11 as used in Embodiment 16 and a general CCD camera 19-11 are disposed on a display 11-11. An interference pattern shaped like multiple ellipses is formed on the display 11-11 by a laser light source 1-11 and the lens 2-11. The interference pattern is grasped by a CCD sensor 3-11 to thereby calculate an optical axis 21-11. Then, an image of the laser light source 1-11 is normally picked up by the CCD camera 19-11 to thereby calculate a line 22-11 passing through the pixel position of the light source and the principal point of the camera. Because the light source 1-11 is located on the line 22-11, a point 20-11 of intersection between the line 22-11 and the optical axis 21-11 indicates the 3D coordinates of the laser light source 1-11. In this manner, the direction of the optical axis of the laser light source 1-11 and the 3D coordinates of the laser light source 1-11 can be measured simultaneously.

When the 3D position of the light source is measured by use of the CCD camera, it is unnecessary to form interference fringes at regular intervals as used in Embodiment 13. The specification of the optical lens for forming the interference pattern can be selected freely. There is a merit that the interval between adjacent interference fringes, the spread angle of the interference fringes, etc. can be designed freely.

Because the 3D position of the light source can be calculated by the method described in this embodiment, the information of the 3D position can be used so that a cursor is located at a point of intersection between the optical axis of the light source and the display surface of the display when the light source is relatively far from the display surface of the display, whereas a cursor is located in a position where the light source is perpendicularly projected onto the display surface of the display when the light source is relatively near to the display surface of the display.

A person far from the display often uses a point on extension of the axis of the laser pointer as an indicating point as in the general laser pointer. A person just near to the display often uses a point perpendicularly projected onto the display as an indicating point. This system can be provided as a pointer system satisfying such person's behavior and easy to handle.

Furthermore, in the inference pattern of multiple ellipses formed by the light source and the optical lens, the size of the multiple ellipses may be reduced so that the interference pattern cannot enter the CCD photo acceptance element array mounted in the frame of the display when the distance between the lens and the plane of projection is short. Therefore, a light-emitting device (LED) for diverging light at a wide angle may be disposed in a neighbor of a laser output point of a light source module having the light source and the optical lens integrated with the light source. An image of the LED is picked up by a plurality of CCD cameras mounted in the frame of the display to thereby calculate the three-dimensional position of the LED. A cursor can be moved to a point obtained by perpendicular projecting the three-dimensional position onto the display surface. In this manner, a cursor is displayed at a point of intersection between the optical axis of the light source module and the display surface when the light source module is far from the display, but the cursor display position is changed over to a point obtained by perpendicularly projecting the LED onto the display surface when the light source module is near to the display. Accordingly, this system can be provided as a pointer system which can be handled easily by a person and which is free from error.

In addition, when buttons equivalent to left and right click buttons of a computer mouse are provided in the light source module, this system can be used conveniently. If the semiconductor laser light source or the LED is switched on and off so that the on/off thereof can be detected by the CCD element array or CCD camera mounted on the display side to perform the position measuring operation when these buttons are pushed, this system can be provided as a pointer system which can be handled easily by a person.

(Embodiment 19)

Figure 38:
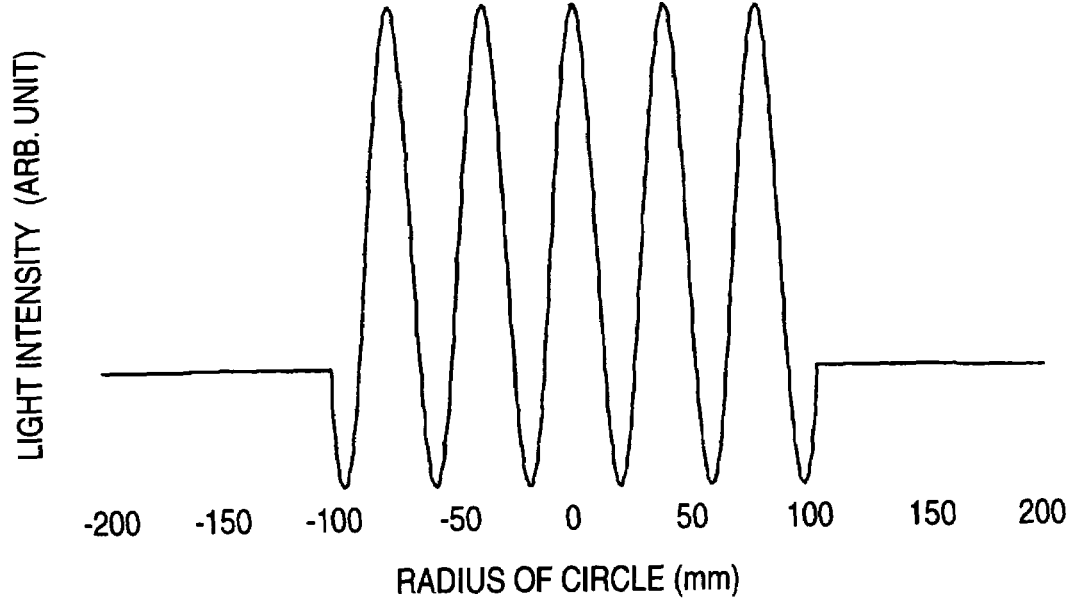
FIG. 38 is a view showing a result of simulation of an interference pattern shaped like concentric circles for acquiring a distance image.

A method for acquiring a distance image according to the invention will be described in Embodiment 19. Semiconductor lasers 1–12a and 1–12b are used as light sources. Conical/concave lenses 2–12a and 2–12b are used as lenses. As will be described later, the configuration of each of the lenses 2–12a and 2–12b is the same as shown in FIGS. 34A and 34B. The lens diameter of each conical/concave lens is Φ1.2 mm. The height of the cone of each lens is 0.1 mm. The curvature radius of the concave surface of each lens is 10 mm. The thickness of each lens is 0.5 mm (on the optical axis). The distance between each semiconductor laser light source and the front end of a corresponding conical/concave lens is 0.1 mm. The distance from each conical/concave lens to the object is about 1 m (1000 mm). The refractive index of each lens is 1.6. The wavelength of light emitted from each semiconductor laser is 780 nm. FIG. 38 shows a result of simulation of the interference pattern formed at a distance of 1 m from each conical/concave lens. The interval between adjacent interference fringes in the interference pattern is wide. One period is 38.65 mm. Because the phase P of the interference pattern is formed as a light intensity distribution, it is obvious from the formulas (1) and (2) that the phase P can be approximated by the square of the cosine function. Accordingly, the phase P can be given by the following formula:

$$P=A\cdot[\cos(\pi*R/38.6567*L/1000)]^2 \quad (12)$$

in which L is the distance (mm) from each lens to the center of concentric circles, R is the radius (mm) of a concentric circle, and A is a constant depending on the intensity of the light source and the light reflection of the object.

In the interference pattern shown in FIG. 38, there are only a circle center exhibiting a peak of light intensity and two concentric circles with the circle center as their centers. This is because the lens system is designed so that the number of concentric circles is reduced. This is for the purpose of eliminating the region of the interference pattern out of the object to thereby omit unnecessary information for generating the distance image. If there are a lot of unnecessary interference peaks, there is a possibility that error may occur in calculation of the distance.

Figure 39:
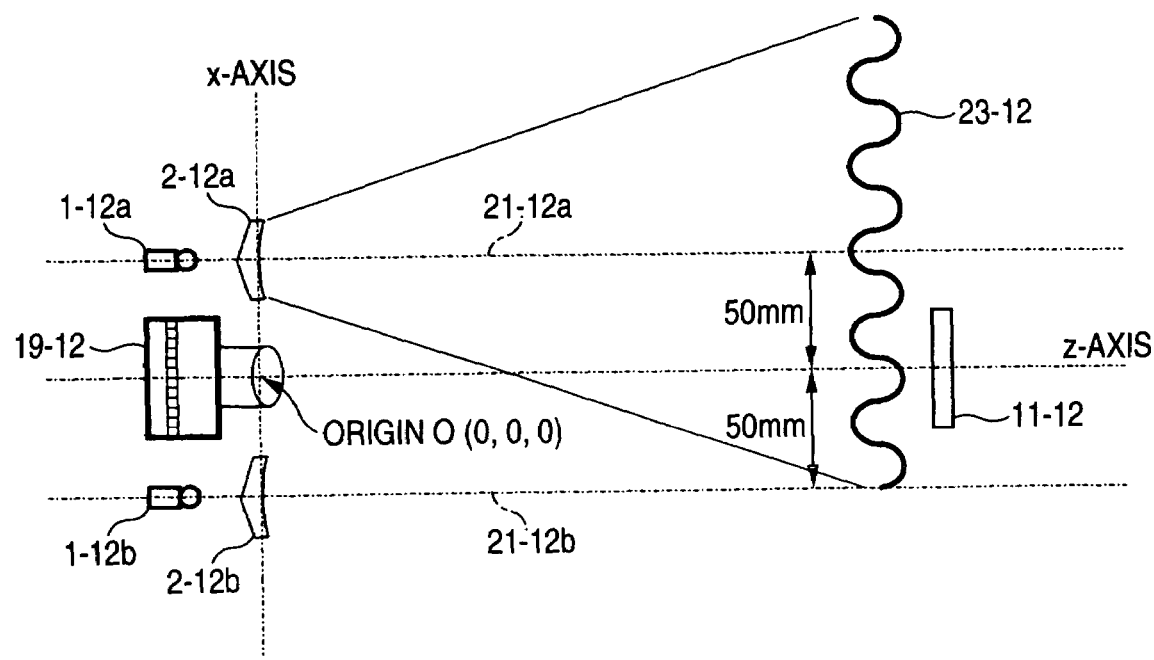
FIG. 39 is a schematic view showing the configuration of a system for acquiring a distance image.
Figure 40:
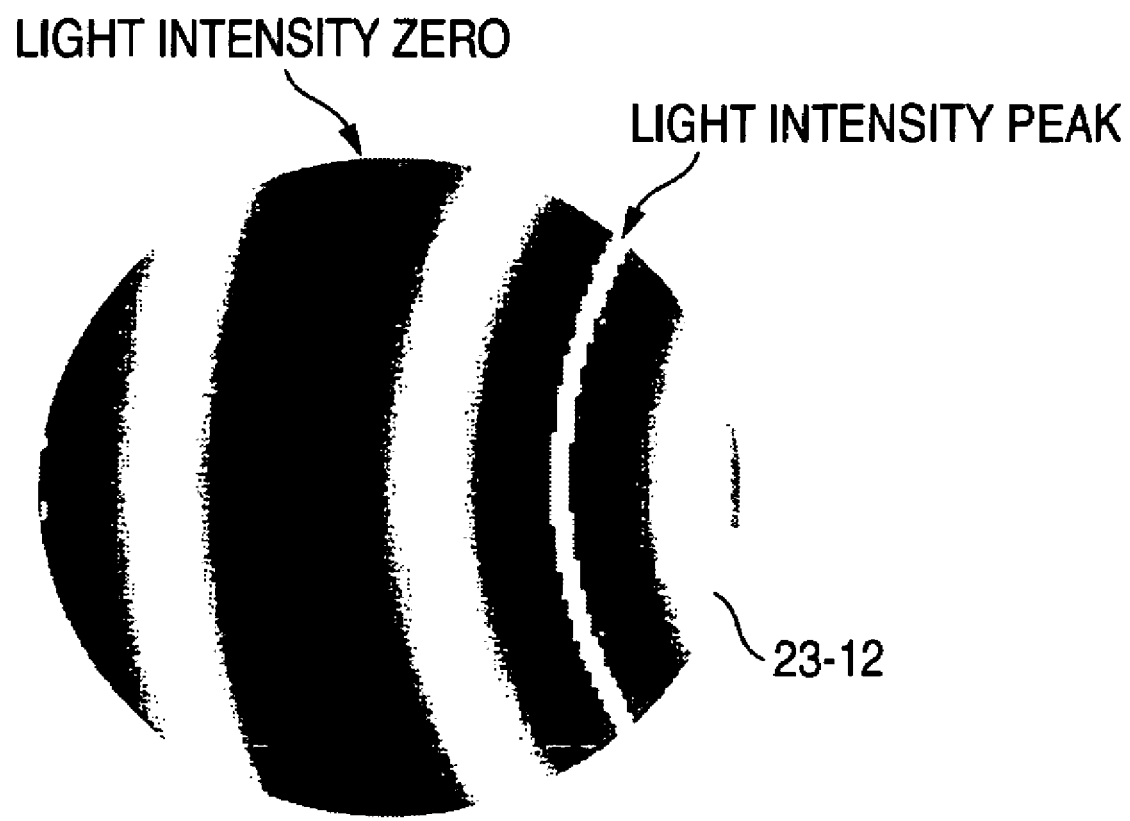
FIG. 40 is a view showing an interference pattern shaped like concentric circles and formed on a gypsum disk.

FIG. 39 is a view showing the configuration of this embodiment. As shown in FIG. 39, semiconductor laser light sources 1–12a and 1–12b and conical/concave lenses 2–12a and 2–12b are used. The semiconductor laser light sources 1–12a and 1–12b are disposed at a distance of 100 mm from each other so that the optical axis of one semiconductor laser light source 1–12a is parallel to that of the other semiconductor laser light source 1–12b. A digital camera 19-12 is disposed at a midpoint of the light sources 1–12a and 1–12b, that is, at a distance of 50 mm from each light source so that the optical axis of the digital camera is parallel to that of each light source. A disk 11-12 with a diameter of Φ50 mm made of gypsum is used as the object. FIG. 40 shows an interference pattern formed on the disk 11-12 in the case where only the semiconductor laser light source 1–12b is switched on. In FIG. 40, there is found a state in which a one-phase's interference pattern 23-12 containing part of concentric circles corresponding peaks and zeros of light intensity is formed. This image is picked up by the digital camera, so that the phase of each pixel is calculated on the basis of data of light intensity and the formula (12). Calculation of the phase is equivalent to calculation of P/A in the formula (12). That is, unknown variables are R and L. Then, the semiconductor laser light source 1–12a is switched on. In this case, an image mirror-reversed to the image shown in FIG. 40 is observed. The mirror-reversed image is picked up by the digital camera in the same manner as described above, so that the phase of each pixel is calculated. A target point corresponding to the pixel is present on a line connecting each pixel position of the digital camera and the principal point of the lens. When the principal point of the lens is taken as the origin (0, 0, 0), the optical axis of the camera as the Z axis, the axis perpendicular to the Z axis and on a plane of FIG. 39 as the X axis and the axis perpendicular to the plane as shown in FIG. 39, the point (x, y, z) of symmetry can be given by the following formula (13) on the basis of the pixel position ($-x_c$, $-y_c$, $-z_c$).

$$\begin{bmatrix} x \\ y \\ z \end{bmatrix} = m_c \begin{bmatrix} x_c \\ y_c \\ z_c \end{bmatrix} \quad (13)$$

It is obvious from this formula (13) that the coordinates (x, y, z) of the point of symmetry can be obtained if $m_c$ can be obtained.

On the other hand, R and L in the formula (12) can be given by the following formulas (14a) and (14b) with respect to the laser light source 1–12a located in the coordinates ($x_a$, $y_a$, $z_a$) and the laser light source 1–12b located in the coordinates ($x_b$, $y_b$, $z_b$).

$$R_a = \sqrt{(x-x_a)^2 + (y-y_a)^2} \quad (14a)$$
$$L_a = z - z_a$$

$$R_b = \sqrt{(x-x_b)^2 + (y-y_b)^2} \quad (14a)$$
$$L_b = z - z_b$$

That is, $R_a$, $R_b$, $L_a$ and $L_b$ can be expressed as functions of $m_c$ on the basis of the formulas (13), (14a) and (14b). When $P_a/A_a$ is the phase corresponding to the formulas (14a) in the case where the laser light source 1–12a is switched on, and $P_b/A_b$ is the phase corresponding to the formulas (14b) in the case where the laser light source 1–12b is switched on, the phases $P_a/A_a$ and $P_b/A_b$ can be given by the formulas:

$$P_a/A_a = F_a(m_c) \quad (15a)$$

$$P_b/A_b = F_b(m_c) \quad (15b)$$

in which each of $F_a$ and $F_b$ is a function expressing a square of the cosine function defined in the formula (12). Values of $m_c$ satisfying the formula (15a) are obtained from the formula (15a). Values of $m_c$ satisfying the formula (15b) are also obtained from the formula (15b). If a value of coincidence of $m_c$ is found from these values, the found value of $m_c$ is a correct solution to be obtained. In this manner, the three-dimensional coordinates of each pixel can be obtained, so that the distance image can be acquired.

In this embodiment, the distance image can be acquired by such a simple configuration that only two semiconductor lasers and only two lenses are disposed in a digital camera. Accordingly, this embodiment is effective in simplifying the configuration, facilitating production, reducing the cost, reducing the size, and so on.

In this embodiment, though not described above, a method in which a light beam having uniform light intensity equal to the peak value of light intensity of the interference pattern is applied and then the interference pattern is formed to thereby detect the phase on the basis of the light intensity ratio can be used as a method for obtaining the phase P/A in the formula (12) accurately. In this case, there is a merit that the phase information of the interference pattern can be grasped accurately even when light scattering or reflection due to the object varies widely according to the place. This method is effective in reducing error and improving positional accuracy.

In this embodiment, an image of the interference pattern formed on the object is picked up by the digital camera. Generally, the digital camera generates a color image by superposing three RGB (red, green and blue) images. Accordingly, if the wavelength of each semiconductor laser as a light source is selected to be fitted to one of the colors RGB exhibiting the highest CCD sensitivity three RGB images of the interference pattern can be picked up separately by the CCD camera when three-color inference patterns are formed simultaneously by the three-color light source. Accordingly, three images of the interference pattern can be picked up at once, so that the distance image of the object can be acquired in a short time.

Although not described in the embodiments, the following contents may be included as a part of the invention.

(1) Although a bifocal lens generally has two focal points on the optical axis, there is a specific condition that the two focal points are coincident with each other. The specific condition is however included in the concept "bifocal lens".

(2) The same effect as in use of a bifocal lens can be also obtained when a small-diameter lens and a large-diameter lens are arranged on the optical axis.

(3) Although the embodiments have been described upon the case where a bifocal lens is used as a lens composed of lens regions which are difference in curvature radius and which are arranged on one optical axis, the same effect as in use of the bifocal lens can be also obtained when a lens composed of lens regions arranged in different optical axes is used, that is, when a circular lens composed of two semicircular lens regions or a circular lens composed of three lens regions obtained by dividing a circle into three is used.

(4) Although a convex lens surface is used in the bifocal lens, it is a matter of course that the interference pattern can be also formed by superposition of laser beams when a concave lens surface is used.

(5) Although the embodiments have been described upon the case where a CCD sensor is used as a unit for detecting the interference pattern, the same effect as in use of the CCD sensor can be also obtained when a C-MOS sensor, an amorphous Si sensor or the like is used.

(6) Although the embodiments have been described upon the case where an optical lens having a spherical surface or a flat surface is used for forming interference on the basis of spherical aberration of the lens, the same effect as in use of the optical lens can be also obtained on the basis of spherical aberration when an aspherical lens such as a parabolic lens or an elliptic lens is used.

(7) Increase in number of CCD sensors disposed, increase in effective length of a circular arc measured or detection of different places on multiple ellipses or concentric circles is effective in obtaining the center point of the multiple ellipses or concentric circles and the three-dimensional position of a laser light source accurately.

(8) Although the embodiments have been described upon the case where the interference pattern is directly formed on the CCD to perform position measurement on the basis of a detection signal issued from the CCD detecting the interference pattern, the CCD may be replaced by a device such as a camera for forming an image on a CCD by using a lens. In this case, the camera needs to have a lens system having low aberration. An image of the interference pattern can be picked up by such a camera.

As described above, in the invention, a pattern of interference of light sufficiently larger than the pixel size of the CCD can be formed and the change of the inference pattern can be observed to calculate the position of the object in spite of a simple configuration having an optical lens system and a CCD sensor. Accordingly, the position of the object can be calculated with high accuracy and high sensitivity.

Because the position of the laser light source can be calculated with high accuracy by use of a simple optical lens system and a commercially available CCD sensor generally used in a still camera or a video camera, the cost can be reduced.

Because interference of light is formed only by use of the optical lens, the cost can be reduced. Particularly when a simple spherical lens is used, the cost can be reduced more greatly. Further, when interference is formed by use of spherical aberration of the simple spherical lens, the outermost circumference of the interference pattern formed on the CCD is so high in light intensity that the interference pattern can be recognized easily. Further, because the interference pattern is always in focus, a large merit can be obtained.

When a bifocal lens composed of inner and outer lens regions different in focal points is used, the degree of freedom for designing the lens can be improved to make the design easy because the curvature radius of the inner lens region and the curvature radius of the outer lens region can be decided freely and independently.

The use of the bifocal lens permits the pitch of interference fringes to be widened so that the interference pattern can be read easily by CCD pixels. Further, the distance from the lens to the CCD can be shortened, so that the size of the system can be reduced. Further, this system can be designed so that the interference pattern can be formed on the CCD even in the case where the light source is far from the optical axis.

When the interference pattern is formed by use of a conical lens, there is a merit that the interference pattern can be projected easily while enlarged. The point indicated by the pointer can be measured easily, so that this system can be used as an input interface of a computer.

When two CCD sensors are used, the three-dimensional position high in detection sensitivity can be measured by use of only movement in a direction perpendicular to an optical axis high in detection sensitivity.

Because a clear image of the interference pattern can be always formed regardless of the distance, there is a merit that detection and image processing can be performed easily.

According to the invention, a position measuring system can be obtained so that position measurement using interference of light is performed inexpensively by a simple configuration.

Further, according to the invention, a pointer capable of inputting data to a computer or a system for acquiring a three-dimensional image of an object can be achieved inexpensively by a simple configuration.

What is claimed is:

1. A position measuring system, comprising:
a light source radiating laser beam;
an optical lens system generating an interference pattern of rays of the laser beam each having passed through different optical path;
a detector of the interference pattern;
an arithmetic unit for calculating the position of an object on the basis of a detection signal issued from the detector; and
an irradiation unit irradiating the object with the laser beam, wherein the optical lens system generates the interference pattern of the rays of the laser beam each having passed through different optical path after the laser beam has been reflected by the object.

2. A position measuring system according to claim 1, wherein the arithmetic unit calculates the position of the light source as the position of the object.

3. A position measuring system according to claim 1, wherein the interference pattern is obtained by use of spherical aberration of a lens.

4. A position measuring system according to claim 1, wherein the optical lens system includes a one-piece lens formed by combination of a plurality of lenses.

5. A position measuring system according to claim 1, further comprising a stop provided on a light input side of the optical lens system.

6. A position measuring system according to claim 1, wherein the detector includes an array of photo acceptance elements arranged one-dimensionally.

7. A position measunng system comprising:
a light source radiating laser beam;
an optical lens system generating an interference pattern of rays of the laser beam each having passed through different optical path;
a detector of the interference pattern;
an arithmetic unit for calculating the position of an object on the basis of a detection signal issued from the detector; and
wherein the optical lens system includes a multifocal lens.

8. A position measuring system comprising:
a light source radiating laser beam;
an optical lens system generating an interference pattern of rays of the laser beam each having passed tbrouh different optical path;
a detector of the interference pattern;
an arithmetic unit for calculating the position of an object on the basis of a detection signal issued from the detector; and
wherein the optical lens system includes at least one member selected from the group consisting of a conical lens, a triangular prism, and a polyangular pyramid lens.

9. A position measuring system comprising:
a light source radiating laser beam;
an optical lens system generating an interference pattern of rays of the laser beam each having passed through different optical path;
a detector of the interference pattern;
an arithmetic unit for calculating the position of an object on the basis of a detection signal issued from the detector; and
wherein the optical lens system includes a one-piece lens formed by combination of a plurality of lenses having focal points located on one optical axis.

10. A position measuring system comprising:
a light source radiating laser beam;
an optical lens system generating an interference pattern of rays of the laser beam each having passed through different optical path;

a detector of the interference pattern;
an arithmetic unit for calculating the position of an object on the basis of a detection signal issued from the detector; and
wherein the optical lens system includes a one-piece lens formed by combination of a plurality of lenses having focal points located on different optical axes.

11. A position measuring system comprising:
a light source radiating laser beam;
an optical lens system generating an interference pattern of rays of the laser beam each having passed throu different optical path;
a detector of the interference pattern;
an arithmetic unit for calculating the position of an object on the basis of a detection signal issued from the detector; and
wherein the curvature radius on the light output side of the lens is constituted by one curvature.

12. A position measuring system comprising:
a light source radiating laser beam;
an optical lens system generating an interference pattern of rays of the laser beam each having passed through different optical path;
a detector of the interference pattern;
an arithmetic unit for calculating the position of an object on the basis of a detection signal issued from the detector; and
wherein the optical lens system includes a reflecting mirror.

13. A position measuring system comprising:
a light source radiating laser beam;
an optical lens system generating an interference pattern of rays of the laser beam each having passed throu different optical path;
a detector of the interference pattern;
an arithmetic unit for calculating the position of an object on the basis of a detection signal issued from the detector; and
wherein the arithmetic unit calculates the position on the basis of the quantity of movement of the interference pattern.

14. A position measuring system comprising:
a light source radiating laser beam;
an optical lens system generating an interference pattern of rays of the laser beam each having passed throu different optical path;
a detector of the interference pattern;
an arithmetic unit for calculating the position of an object on the basis of a detection signal issued from the detector; and
wherein the arithmetic unit calculates the position on the basis of the number of interference fringes in the interference pattern.

15. A position measuring system comprising:
a light source radiating laser beam;
an optical lens system generating an interference pattern of rays of the laser beam each having passed through different optical path;
a detector of the interference pattern;
an arithmetic unit for calculating the position of an object on the basis of a detection signal issued from the detector; and
wherein the arithmetic unit calculates the position on the basis of the whole shape of the interference pattern.

16. A position measuring system comprising:
a light source radiating laser beam;
an optical lens system generating an interference pattern of rays of the laser beam each having passed through different optical path;
a detector of the interference pattern;
an arithmetic unit for calculating the position of an object on the basis of a detection signal issued from the detector; and
wherein the detector comprises a plurality of detectors so that the arithmetic unit calculates the three-dimensional position of the light source by using the plurality of detectors.

17. A position measuring system comprising:
a light source radiating laser beam;
an optical lens system aenerating an interference pattern of rays of the laser beam each having passed through different optical path;
a detector of the interference pattern;
an arithmetic unit for calculating the position of an object on the basis of a detection signal issued from the detector; and
wherein the light source comprises a plurality of light sources so that the arithmetic unit calculates the three-dimensional position of the detector by using the plurality of light sources.

18. A position measuring system comprising:
a light source radiating laser beam;
an optical lens system generating an interference pattern of rays of the laser beam each having passed through different optical path;
a detector of the interference pattern;
an arithmetic unit for calculating the position of an object on the basis of a detection signal issued from the detector;
an irradiation unit irradiating the object with the laser beam,
wherein the optical lens system generates the interference pattern of the rays of the laser beam each having passed through different optical path after the laser beam has been reflected by the object, and
the object includes a reflecting member having a high reflectance region.

19. A position measunng system comprising:
a light source radiating laser beam;
an optical lens system generating an interference pattern of rays of the laser beam each having passed through different optical path;
a detector of the interference pattern;
an arithmetic unit for calculating the position of an object on the basis of a detection signal issued from the detector; and
wherein the optical lens system includes a hemisphere lens.

20. A position measuring system comprising:
a light source radiating laser beam;
an optical lens system generating an interference pattern of rays of the laser beam each having passed through different optical path;
a detector of the interference pattern;
an arithmetic unit for calculating the position of an object on the basis of a detection signal issued from the detector; and
wherein the optical lens system is provided so that a first surface of a lens to which light is input is formed as a convex spherical surface and a second surface of the lens from which light is output is formed as a planar surface and disposed in a vicinity of the detector.

21. A position measuring system comprising:
a light source radiating laser beam;
an optical lens system generating an interference pattern of rays of the laser beam each having passed throu different optical path;
a detector of the interference pattern;
an arithmetic unit for calculating the position of an object on the basis of a detection signal issued from the detector; and
wherein the optical lens system is provided so that a first surface of a lens to which light is input is formed as a convex spherical surface, and a substance having a predetermined refractive index is filled in a gap between the spherical surface and the detector.

22. A position measuring system comprising:
a light source radiating laser beam;
an optical lens system generating an interference pattern of rays of the laser beam each having passed through different optical path;
a detector of the interference pattern;
an arithmetic unit for calculating the position of an object on the basis of a detection signal issued from the detector; and
wherein the optical lens system includes a sphere lens.

23. A position measuring system comprising:
a light source radiating laser beam;
an optical lens system generating an interference pattern of rays of the laser beam each having passed through different optical path;
a detector of the interference pattern;
an arithmetic unit for calculating the position of an object on the basis of a detection signal issued from the detector; and
wherein the detector includes two arrays, each of which has photo acceptance elements arranged one-dimensionally and which are disposed so as to be perpendicular to each other in a plane perpendicular to an optical axis.

24. A position measuring system comprising:
a light source radiating laser beam;
an optical lens system generating an interference pattern of rays of the laser beam each having passed through different optical path;
a detector of the interference pattern;
an arithmetic unit for calculating the position of an object on the basis of a detection signal issued from the detector; and
wherein the detector includes an array of photo acceptance elements arranged two-dimensionally.

25. A position measuring system comprising:
a light source radiating laser beam;
an optical lens system generating an interference pattern of rays of the laser beam each having passed through different optical path;
a detector of the interference pattern;
an arithmetic unit for calculating the position of an object on the basis of a detection signal issued from the detector; and
wherein the light source comprises a plurality of light sources radiating laser beams at different wavelengths respectively, the optical lens system comprises a plurality of optical lens systems generating interference patterns from the laser beams respectively, the detector comprises a plurality of detectors detecting the interference patterns respectively, and the arithmetic unit calculates the position of at least one of the plurality of detectors on the basis of detection signals issued from the plurality of detectors respectively.

26. A position measuring system according to claim 25, wherein the plurality of light sources radiate laser beams successively as pulse lights so that the plurality of detectors detect the interference patterns in synchronism with the laser beams respectively.

27. A position measuring system according to claim 25, wherein each of the plurality of optical lens systems includes a conical lens.

28. A position measuring system comprising:
a light source radiating laser beam;
an optical lens system generating an interference pattern of rays of the laser beam each having passed through different optical path;
a detector of the interference pattern;
an arithmetic unit for calculating the position of an object on the basis of a detection signal issued from the detector; and
wherein the optical lens system generates the interference pattern on the object, the detector detects the interference pattern on the object and the arithmetic unit calculates a point of intersection between an optical axis of the optical lens system and a detection surface of the detector.

29. A position measuring system according to claim 28, wherein the arithmetic unit measures a linear equation expressing the optical axis of the optical lens system or the three-dimensional position of the light source.

30. A position measuring system according to claim 28, wherein the arithmetic unit calculates a linear equation expressing the optical axis on the basis of change of curvature in elliptic shape of the interference pattern and calculates the distance to the light source on the basis of the pitch of arrangement in the interference pattern to thereby measure the three-dimensional position of the light source.

31. A position measuring system according to claim 28, wherein the detector comprises a plurality of detectors disposed closely to one another so that a region of the interference pattern detected by the detectors is enlarged to improve accuracy in detection of the three-dimensional position of the light source.

32. A position measuring system according to claim 28, wherein the detector is composed of a camera having a camera lens so that the camera picks up an image of the interference pattern having a region larger than the size of a photo acceptance element built in the camera.

33. A position measuring system according to claim 28, further comprising an image pick-up unit for picking up an image of the light source in addition to the detector for detecting the interference pattern, wherein the three-dimensional position of the light source is measured on the basis of the interference pattern detected by the detector and the image of the light source picked up by the image pick-up unit.

34. A position measuring system comprising:
a light source radiating laser beam;
an optical lens system generating an interference pattern of rays of the laser beam each having passed through different optical path;
a detector of the interference pattern;
an arithmetic unit for calculating the position of an object on the basis of a detection signal issued from the detector; and
an input device integrally provided with the light source and a pen used for writing on a plane, wherein the arithmetic unit calculates the three-dimensional position of the input device to thereby acquire the shape of the character written on the plane.

35. A position measuring system comprising:
a light source radiating laser beam;
an optical lens system generating an interference pattern of rays of the laser beam each having passed through different optical path;
a detector of the interference pattern;
an arithmetic unit for calculating the position of an object on the basis of a detection signal issued from the detector; and
wherein the optical lens system generates the interference pattern on the object, the detector detects the interference pattern on the object and the detector is a camera unit for picking up an image of the interference pattern generated on the object, the interference pattern is a periodic interference pattern having light intensity varying periodically, and the arithmetic unit acquires a distance image of the object on the basis of phase information in the periodic variation of light intensity.

36. A distance image acquiring system according to claim 35, wherein the light source and the optical lens system disposed just in front of the light source are integrated as a light source module, and a plurality of light source modules as defined above are disposed so that a plurality of periodic interference patterns are formed on the object and that the distance image of the object is acquired on the basis of phase information in the plurality of periodic interference patterns.

37. A distance image acquiring system according to claim 36, wherein the plurality of light source modules emit laser beams at different wavelengths respectively; the camera unit includes a plurality of photo acceptance sensors for detecting light according to the laser beams, and the distance image is acquired on the basis of image information of the interference patterns corresponding to the different wavelengths.

38. A distance image acquiring system according to claim 36, further comprising a reference beam projecting unit disposed near the installation place of the light source modules projecting a reference beam onto the object, wherein the arithmetic unit calculates phase information of each pixel in an image of the object picked up by the camera unit on the basis of comparison between luminance information of the reference beam detected by the detector and luminance information of the interference patterns detected by the detector.

39. A distance image acquiring system according to claim 35, wherein the light source for radiating the laser beam is composed of three light source modules for outputting red, green and blue laser beams, the camera unit includes three photo acceptance sensors for detecting the red, green and blue laser beams, and the distance image of the object is acquired on the basis of image information in the interference patterns of the red, green and blue laser beams.

40. A position measuring system comprising:
a light source radiating laser beam;
an optical lens system generating an interference pattern of rays of the laser beam each having passed through different optical path;
a detector of the interference pattern;
an arithmetic unit for calculating the position of an object on the basis of a detection signal issued from the detector; and
a pointer module in which the light source and the optical lens system are integrated with each other; and a cursor position display means, wherein the object is a display region of an image, the detector is disposed in a vicinity of the object, and the cursor position display means displays a cursor at the position of a point of intersection between an optical axis of the optical lens system and a detection surface of the detector or at a position of the light source projected onto the display region on the basis of the position of the object calculated by the arithmetic unit.

41. A pointer system according to claim 40, wherein the detector comprises a plurality of detectors disposed at two or more places for characterizing the display region to thereby specify the display region.

42. A pointer system according to claim 40, wherein the detector comprises a plurality of detectors, the display region is rectangular or shaped like a rectangle, and the detectors are disposed at opposite ends of a side of the display region or at two corners of a diagonal line of the display region or at midpoints of long and short sides of the display region to thereby specify the display region.

43. A pointer system according to claim 40, wherein the position of a point of intersection between the optical axis of the optical lens system and the detection surface of the detector is used as a cursor position when the light source is far from the display region whereas the position of the light source projected onto the display region is used as a cursor position when the light source is near to the display region.

44. A pointer system according to claim 40, wherein the pointer module is provided with a button equivalent to a left or right click button of a computer mouse and when the button is operated, the light source is turned on and off at intervals of a predetermined time or in a predetermined time sequence pattern so that the resulting optical signal is received by the detector to thereby perform the function of the left or right click button.

45. An input device used for a position measuring system including:
a light source radiating laser beam;
an optical lens system generating an interference pattern of rays of the laser beam each having passed through different optical path;
a detector of the interference pattern;
an arithmetic unit for calculating the position of an object on the basis of a detection signal issued from the detector
the input device, comprising:
the light source; and
a pen used for writing on papers, the pen is integrated with the light source.

46. An input device according to claim 45, wherein the light source radiates the laser beam on the basis of pressure produced when a character is written with the pen.

47. An input device according to claim 45, further comprising a pressure sensor for detecting the pressure produced when a character is written with the pen; and a controller for varying light quantity of the light source according to the pressure.

48. An input device according to claim 45, further comprising a reflecting mirror by which the laser beam radiated from the light source is reflected at a wide angle.

49. A position measuring system comprising:
a pointer having a light source that radiates laser beam and an optical lens system that generates an interference pattern of rays of the laser beam each having passed through different optical path;

a detector of the interference pattern; and an arithmetic unit for calculating the position of an object on the basis of a detection signal issued from the detector, wherein the optical lens system projects the interference pattern on the object, the detector is disposed in a vicinity of the object for detecting the interference pattern, and the arithmetic unit calculates the center position of the interference pattern.

50. A position measuring system according to claim 49, wherein the object is a display.

51. A position measuring system according to claim 50, wherein the pointer has a cursor to be moved on the display on the basis of the center position of the interference pattern.

52. A position measuring system according to claim 50, wherein the light source of the pointer can change its pulse light-emitting time.

53. A position measuring system according to claim 52, wherein the detector can detect the change of the pulse light-emitting time of the light source.

* * * * *